(12) United States Patent
Siefker et al.

(10) Patent No.: US 11,190,609 B2
(45) Date of Patent: Nov. 30, 2021

(54) CONNECTION POOLING FOR SCALABLE NETWORK SERVICES

(71) Applicant: Amazon Technologies, Inc., Seattle, WA (US)

(72) Inventors: Adam Charles Siefker, Lynnwood, WA (US); Sean Oczkowski, Seattle, WA (US); David Richardson, Seattle, WA (US); Samvid H. Dwarakanath, Seattle, WA (US); Marc John Brooker, Seattle, WA (US); Orr Weinstein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 16/457,570

(22) Filed: Jun. 28, 2019

(65) Prior Publication Data

US 2020/0412825 A1 Dec. 31, 2020

(51) Int. Cl.
*H04L 29/08* (2006.01)
*H04L 29/12* (2006.01)
(Continued)

(52) U.S. Cl.
CPC ...... *H04L 67/2833* (2013.01); *H04L 12/4645* (2013.01); *H04L 61/1511* (2013.01);
(Continued)

(58) Field of Classification Search
CPC ............ H04L 67/2833; H04L 61/1511; H04L 12/4645; H04L 63/0876; H04L 67/1002; H04L 2212/00
See application file for complete search history.

(56) References Cited

U.S. PATENT DOCUMENTS 4,949,254 A 8/1990 Shorter
5,283,888 A 2/1994 Dao et al.
(Continued)

FOREIGN PATENT DOCUMENTS

CA 2975522 A1 8/2016
CN 1341238 A 3/2002
(Continued)

OTHER PUBLICATIONS

Ha et al., A Concurrent Trace-based Just-In-Time Compiler for Single-threaded JavaScript, utexas.edu (Year: 2009).
(Continued)

*Primary Examiner* — Austin J Moreau
(74) *Attorney, Agent, or Firm* — Knobbe, Martens, Olson & Bear, LLP

(57) ABSTRACT

Systems and methods are described for providing connection pools between source network devices and a target, connection-limited service. Each connection pool can facilitate connections between source devices and the target service, while ensuring that connections to the connection-limited service do not exceed a defined limit. A connection manager service can initialize a connection pool for a target service on request by a client device, and provide an identifier for the connection pool to the client device. Source network devices can then transmit operations for the target service to the connection manager service, which can route the operations to an appropriate connection pool based on the identifier.

20 Claims, 11 Drawing Sheets

(51) Int. Cl.
*H04L 12/46* (2006.01)
*H04L 29/06* (2006.01)

(52) U.S. Cl.
CPC ...... *H04L 63/0876* (2013.01); *H04L 67/1002* (2013.01); *H04L 2212/00* (2013.01)

(56) References Cited

U.S. PATENT DOCUMENTS

| | | | |
|---|---|---|---|
| 5,970,488 A | 10/1999 | Crowe et al. | |
| 5,983,197 A | 11/1999 | Enta | |
| 6,237,005 B1 | 5/2001 | Griffin | |
| 6,260,058 B1 | 7/2001 | Hoenninger et al. | |
| 6,385,636 B1 | 5/2002 | Suzuki | |
| 6,463,509 B1 | 10/2002 | Teoman et al. | |
| 6,501,736 B1 | 12/2002 | Smolik et al. | |
| 6,523,035 B1 | 2/2003 | Fleming et al. | |
| 6,549,936 B1 | 4/2003 | Hirabayashi | |
| 6,708,276 B1 | 3/2004 | Yarsa et al. | |
| 7,036,121 B1 | 4/2006 | Casabona et al. | |
| 7,308,463 B2 | 12/2007 | Taulbee et al. | |
| 7,340,522 B1 | 3/2008 | Basu et al. | |
| 7,360,215 B2 | 4/2008 | Kraiss et al. | |
| 7,558,719 B1 | 7/2009 | Donlin | |
| 7,577,722 B1 | 8/2009 | Khandekar et al. | |
| 7,590,806 B2 | 9/2009 | Harris et al. | |
| 7,665,090 B1 | 2/2010 | Tormasov et al. | |
| 7,707,579 B2 | 4/2010 | Rodriguez | |
| 7,730,464 B2 | 6/2010 | Trowbridge | |
| 7,774,191 B2 | 8/2010 | Berkowitz et al. | |
| 7,823,186 B2 | 10/2010 | Pouliot | |
| 7,831,464 B1 | 11/2010 | Nichols et al. | |
| 7,870,153 B2 | 1/2011 | Croft et al. | |
| 7,886,021 B2 | 2/2011 | Scheifler et al. | |
| 7,949,677 B2 | 5/2011 | Croft et al. | |
| 7,954,150 B2 | 5/2011 | Croft et al. | |
| 8,010,679 B2 | 8/2011 | Low et al. | |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,051,180 B2 | 11/2011 | Mazzaferri et al. | |
| 8,051,266 B2 | 11/2011 | DeVal et al. | |
| 8,065,676 B1 | 11/2011 | Sahai et al. | |
| 8,065,682 B2 | 11/2011 | Baryshnikov et al. | |
| 8,095,931 B1 | 1/2012 | Chen et al. | |
| 8,127,284 B2 | 2/2012 | Meijer et al. | |
| 8,146,073 B2 | 3/2012 | Sinha | |
| 8,166,304 B2 | 4/2012 | Murase et al. | |
| 8,171,473 B2 | 5/2012 | Lavin | |
| 8,201,026 B1 | 6/2012 | Bornstein et al. | |
| 8,209,695 B1 | 6/2012 | Pruyne et al. | |
| 8,219,987 B1 | 7/2012 | Vlaovic et al. | |
| 8,296,267 B2 | 10/2012 | Cahill et al. | |
| 8,321,554 B2 | 11/2012 | Dickinson | |
| 8,321,558 B1 | 11/2012 | Sirota et al. | |
| 8,336,079 B2 | 12/2012 | Budko et al. | |
| 8,352,608 B1 | 1/2013 | Keagy et al. | |
| 8,387,075 B1 | 2/2013 | McCann et al. | |
| 8,392,558 B1 | 3/2013 | Ahuja et al. | |
| 8,417,723 B1 | 4/2013 | Lissack et al. | |
| 8,429,282 B1 | 4/2013 | Ahuja | |
| 8,448,165 B1 | 5/2013 | Conover | |
| 8,479,195 B2 | 7/2013 | Adams et al. | |
| 8,490,088 B2 | 7/2013 | Tang | |
| 8,555,281 B1 | 10/2013 | Van Dijk et al. | |
| 8,560,699 B1 | 10/2013 | Theimer et al. | |
| 8,566,835 B2 | 10/2013 | Wang et al. | |
| 8,601,323 B2 | 12/2013 | Tsantilis | |
| 8,613,070 B1 | 12/2013 | Borzycki et al. | |
| 8,615,589 B1 | 12/2013 | Adogla et al. | |
| 8,631,130 B2 | 1/2014 | Jackson | |
| 8,667,471 B2 | 3/2014 | Wintergerst et al. | |
| 8,677,359 B1 | 3/2014 | Cavage et al. | |
| 8,694,996 B2 | 4/2014 | Cawlfield et al. | |
| 8,700,768 B2 | 4/2014 | Benari | |
| 8,719,415 B1 | 5/2014 | Sirota et al. | |
| 8,725,702 B1 | 5/2014 | Raman et al. | |
| 8,756,322 B1 | 6/2014 | Lynch | |
| 8,756,696 B1 | 6/2014 | Miller | |
| 8,769,519 B2 | 7/2014 | Leitman et al. | |
| 8,793,676 B2 | 7/2014 | Quinn et al. | |
| 8,799,236 B1 | 8/2014 | Azari et al. | |
| 8,799,879 B2 | 8/2014 | Wright et al. | |
| 8,806,468 B2 | 8/2014 | Meijer et al. | |
| 8,806,644 B1 | 8/2014 | McCorkendale et al. | |
| 8,819,679 B2 | 8/2014 | Agarwal et al. | |
| 8,825,863 B2 | 9/2014 | Hansson et al. | |
| 8,825,964 B1 | 9/2014 | Sopka et al. | |
| 8,839,035 B1 | 9/2014 | Dimitrovich et al. | |
| 8,850,432 B2 | 9/2014 | Mcgrath et al. | |
| 8,869,300 B2 | 10/2014 | Singh et al. | |
| 8,874,952 B2 | 10/2014 | Tameshige et al. | |
| 8,904,008 B2 | 12/2014 | Calder et al. | |
| 8,966,495 B2 | 2/2015 | Kulkarni | |
| 8,972,980 B2 | 3/2015 | Banga et al. | |
| 8,997,093 B2 | 3/2015 | Dimitrov | |
| 9,002,871 B2 | 4/2015 | Bulkowski et al. | |
| 9,021,501 B2 | 4/2015 | Li et al. | |
| 9,027,087 B2 | 5/2015 | Ishaya et al. | |
| 9,038,068 B2 | 5/2015 | Engle et al. | |
| 9,052,935 B1 | 6/2015 | Rajaa | |
| 9,086,897 B2 | 7/2015 | Oh et al. | |
| 9,086,924 B2 | 7/2015 | Barsness et al. | |
| 9,092,837 B2 | 7/2015 | Bala et al. | |
| 9,098,528 B2 | 8/2015 | Wang | |
| 9,104,477 B2 | 8/2015 | Kodialam et al. | |
| 9,110,732 B1 | 8/2015 | Forschmiedt et al. | |
| 9,110,770 B1 | 8/2015 | Raju et al. | |
| 9,111,037 B1 | 8/2015 | Nalis et al. | |
| 9,112,813 B2 | 8/2015 | Jackson | |
| 9,116,733 B2 | 8/2015 | Banga et al. | |
| 9,141,410 B2 | 9/2015 | Leafe et al. | |
| 9,146,764 B1 | 9/2015 | Wagner | |
| 9,152,406 B2 | 10/2015 | De et al. | |
| 9,164,754 B1 | 10/2015 | Pohlack | |
| 9,183,019 B2 | 11/2015 | Kruglick | |
| 9,208,007 B2 | 12/2015 | Harper et al. | |
| 9,218,190 B2 | 12/2015 | Anand et al. | |
| 9,223,561 B2 | 12/2015 | Orveillon et al. | |
| 9,223,966 B1 | 12/2015 | Satish et al. | |
| 9,250,893 B2 | 2/2016 | Blahaerath et al. | |
| 9,268,586 B2 | 2/2016 | Voccio et al. | |
| 9,298,633 B1 | 3/2016 | Zhao et al. | |
| 9,317,689 B2 | 4/2016 | Aissi | |
| 9,323,556 B2 | 4/2016 | Wagner | |
| 9,361,145 B1 | 6/2016 | Wilson et al. | |
| 9,405,582 B2 | 8/2016 | Fuller et al. | |
| 9,411,645 B1 | 8/2016 | Duan et al. | |
| 9,413,626 B2 | 8/2016 | Reque et al. | |
| 9,417,918 B2 | 8/2016 | Chin et al. | |
| 9,430,290 B1 | 8/2016 | Gupta et al. | |
| 9,436,555 B2 | 9/2016 | Dornemann et al. | |
| 9,461,996 B2 | 10/2016 | Hayton et al. | |
| 9,471,775 B1 | 10/2016 | Wagner et al. | |
| 9,471,776 B2 | 10/2016 | Gu et al. | |
| 9,483,335 B1 | 11/2016 | Wagner et al. | |
| 9,489,227 B2 | 11/2016 | Oh et al. | |
| 9,497,136 B1 | 11/2016 | Ramarao et al. | |
| 9,501,345 B1 | 11/2016 | Lietz et al. | |
| 9,514,037 B1 | 12/2016 | Dow et al. | |
| 9,537,788 B2 | 1/2017 | Reque et al. | |
| 9,563,613 B1 | 2/2017 | Dinkel et al. | |
| 9,575,798 B2 | 2/2017 | Terayama et al. | |
| 9,588,790 B1 | 3/2017 | Wagner et al. | |
| 9,594,590 B2 | 3/2017 | Hsu | |
| 9,596,350 B1 | 3/2017 | Dymshyts et al. | |
| 9,600,312 B2 | 3/2017 | Wagner et al. | |
| 9,613,127 B1 | 4/2017 | Rus et al. | |
| 9,626,204 B1 | 4/2017 | Banga et al. | |
| 9,628,332 B2 | 4/2017 | Bruno, Jr. et al. | |
| 9,635,132 B1 | 4/2017 | Lin et al. | |
| 9,652,306 B1 | 5/2017 | Wagner et al. | |
| 9,652,617 B1 | 5/2017 | Evans et al. | |
| 9,654,508 B2 | 5/2017 | Barton et al. | |
| 9,661,011 B1 | 5/2017 | Van Horenbeeck et al. | |

(56) References Cited

U.S. PATENT DOCUMENTS

| | | |
|---|---|---|
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,615,984 B1 | 4/2020 | Wang |
| 10,623,476 B2 | 4/2020 | Thompson |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 11,016,815 B2 | 5/2021 | Wisniewski et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1* | 11/2005 | Colrain .............. G06F 9/505 709/200 |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |

(56) References Cited

U.S. PATENT DOCUMENTS

| | | |
|---|---|---|
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0034537 A1* | 2/2009 | Colrain .............. H04L 67/327 370/400 |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |

(56) References Cited

U.S. PATENT DOCUMENTS

| | | |
|---|---|---|
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178110 A1 | 6/2015 | Li et al. |
| 2015/0186129 A1 | 7/2015 | Apte et al. |

(56) References Cited

U.S. PATENT DOCUMENTS

| | | |
|---|---|---|
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0031591 A1 | 10/2016 | Kaufman |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1* | 3/2017 | Biruduraju .......... H04L 12/4633 |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0147656 A1* | 5/2017 | Choudhary .......... G06F 16/2471 |
| 2017/0149740 A1 | 5/2017 | Mansour et al. |
| 2017/0161059 A1 | 6/2017 | Wood et al. |
| 2017/0177854 A1 | 6/2017 | Gligor et al. |
| 2017/0188213 A1 | 6/2017 | Nirantar et al. |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0150339 A1 | 5/2018 | Pan et al. |
| 2018/0192101 A1 | 7/2018 | Bilobrov |
| 2018/0225096 A1 | 8/2018 | Mishra et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0309819 A1 | 10/2018 | Thompson |
| 2018/0341504 A1 | 11/2018 | Kissell |
| 2018/0365422 A1 | 12/2018 | Callaghan et al. |
| 2019/0004866 A1 | 1/2019 | Du et al. |
| 2019/0028552 A1 | 1/2019 | Johnson, II et al. |
| 2019/0043231 A1 | 2/2019 | Uzgin et al. |
| 2019/0072529 A1 | 3/2019 | Andrawes et al. |
| 2019/0079751 A1 | 3/2019 | Foskett et al. |
| 2019/0102231 A1 | 4/2019 | Wagner |
| 2019/0108058 A1 | 4/2019 | Wagner et al. |
| 2019/0140831 A1 | 5/2019 | De Lima Junior et al. |
| 2019/0147085 A1 | 5/2019 | Pal et al. |
| 2019/0155629 A1 | 5/2019 | Wagner et al. |
| 2019/0171423 A1 | 6/2019 | Mishra et al. |
| 2019/0171470 A1 | 6/2019 | Wagner |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0227849 A1 | 7/2019 | Wisniewski et al. |

(56) References Cited

U.S. PATENT DOCUMENTS

| | | |
|---|---|---|
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0318312 A1 | 10/2019 | Foskett et al. |
| 2019/0361802 A1 | 11/2019 | Li et al. |
| 2019/0363885 A1 | 11/2019 | Schiavoni et al. |
| 2019/0384647 A1 | 12/2019 | Reque et al. |
| 2019/0391834 A1 | 12/2019 | Mullen et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0120120 A1 | 4/2020 | Cybulski |
| 2020/0142724 A1 | 5/2020 | Wagner et al. |
| 2020/0153897 A1 | 5/2020 | Mestery et al. |
| 2020/0167208 A1 | 5/2020 | Floes et al. |
| 2020/0192707 A1 | 6/2020 | Brooker et al. |
| 2020/0213151 A1* | 7/2020 | Srivatsan ............. H04L 9/0643 |
| 2020/0341799 A1 | 10/2020 | Wagner et al. |
| 2020/0366587 A1* | 11/2020 | White ................. G06F 11/3684 |
| 2020/0412707 A1 | 12/2020 | Siefker et al. |
| 2020/0412720 A1 | 12/2020 | Siefker et al. |
| 2021/0081233 A1 | 3/2021 | Mullen et al. |

FOREIGN PATENT DOCUMENTS

| | | |
|---|---|---|
| CN | 101002170 A | 7/2007 |
| CN | 101345757 A | 1/2009 |
| CN | 101496005 A | 7/2009 |
| EP | 2663052 A1 | 11/2013 |
| EP | 3201762 A1 | 8/2017 |
| EP | 3254434 A1 | 12/2017 |
| EP | 3201768 B1 | 12/2019 |
| EP | 3811209 A1 | 4/2021 |
| JP | 2002287974 A | 10/2002 |
| JP | 2006-107599 A | 4/2006 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |

OTHER PUBLICATIONS

Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).

Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).

Tange, "GNU Parallel: The Command-Line Power Tool", vol. 36, No. 1, Jan. 1, 1942, pp. 42-47.

Wood, Timothy, et al. "Cloud Net: dynamic pooling of cloud resources by live WAN migration of virtual machines." ACM Sigplan Notices 46.7 (2011): 121-132. (Year: 2011).

Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.

Extended Search Report in European Application No. 19199402.9 dated Mar. 6, 2020.

Office Action in Canadian Application No. 2,962,633 dated May 21, 2020.

Office Action in Canadian Application No. 2,962,631 dated May 19, 2020.

International Search Report for Application No. PCT/US2019/038520 dated Aug. 14, 2019.

International Search Report and Written Opinion dated Oct. 15, 2019 for International Application No. PCT/US2019/039246 in 16 pages.

International Search Report for Application No. PCT/US2020/039996 dated Oct. 8, 2020.

U.S. Appl. No. 16/457,537, Facilitating Service Connections in Serverless Code Executions, filed Jun. 28, 2019.

U.S. Appl. No. 16/457,504, Authentication to Network-Services Using Hosted Authentication Information, filed Jun. 28, 2019.

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.

CodeChef IDE web page, Code, Compile & Run, retrieved from https://www.codechef.com/ide, 2019.

Czajkowski, G., and L. Daynes, Multitasking Without Compromise: A Virtual Machine Evolution 47(4a):60-73, ACM SIGPLAN Notices—Supplemental Issue, Apr. 2012.

(56) References Cited

OTHER PUBLICATIONS

Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", SUPERCOMPUTING, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.Wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en .wikipedia.org/wiki/Recursion_(computer _science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.

(56) References Cited

OTHER PUBLICATIONS

International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Bebenita et al., "Trace-Based Compilation in Execution Environments without Interpreters," ACM, Copyright 2010, 10 pages.
Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless-mapred uce >.
Dean et al, "MapReduce: Simplified Data Processing on Large Clusters", ACM, 2008, pp. 107-113.
Ekanayake et al, "Twister: A Runtime for Iterative MapReduce", ACM, 2010, pp. 810-818.
Fan et al., Online Optimization of VM Deployment in IaaS Cloud, 2012, 6 pages.
Hammoud et al, "Locality-Aware Reduce Task Scheduling for MapReduce", IEEE, 2011, pp. 570-576.
Kim et al, "MRBench: A Benchmark for Map-Reduce Framework", IEEE, 2008, pp. 11-18.
Lin, "MR-Apriori: Association Rules Algorithm Based on MapReduce", IEEE, 2014, pp. 141-144.
Search Query Report from IP.com, performed Dec. 2, 2020.
Yang, The Application of MapReduce in the Cloud Computing:, IEEE, 2011, pp. 154-156.
Office Action in European Application No. 19199402.9 dated Mar. 23, 2021.
Office Action in Japanese Application No. 2017-516160 dated Jan. 15, 2018.
Notice of Allowance in Japanese Application No. 2017-516160 dated May 8, 2018.
Office Action in Indian Application No. 201717013356 dated Jan. 22, 2021.
Office Action in Japanese Application No. 2017-516168 dated Mar. 26, 2018.
Office Action in Indian Application No. 201717019903 dated May 18, 2020.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
First Examination Report for Indian Application No. 201717034806 dated Jun. 25, 2020.
Office Action in European Application No. 16781265.0 dated Jul. 13, 2020.
Office Action in European Application No. 201817013748 dated Nov. 20, 2020.
Office Action in European Application No. 16823419.3 dated Mar. 12, 2021.
Office Action in European Application No. 17776325.7 dated Apr. 12, 2021.
Office Action in European Application No. 17740533.9 dated May 4, 2021.
Office Action in European Application No. 17743108.7 dated Dec. 22, 2020.
International Preliminary Report on Patentability dated Dec. 29, 2020 for International Application No. PCT/US2019/039246 in 8 pages.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Search Report for Application No. PCT/US2020/062060 dated Mar. 5, 2021.

* cited by examiner

CONNECTION POOLING FOR SCALABLE NETWORK SERVICES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Virtualization technologies and data centers enable a variety of new techniques for providing network-based services. One such technique is "micro-services," in which desired functionality is not simply housed within a single device providing a service, but distributed among a variety of smaller, fine-grained services (each a "micro-service"). Micro-services may be independently developed, maintained, managed, and scaled, providing higher flexibility and resiliency to "macro-services" built using the micro-services. A difficulty that arises in the use of micro-services is the need for such services to securely intercommunicate. Often, different micro-services are implemented on different platforms or hosts, and subject to different security constraints. Moreover, different micro-services may scale independently of one another. Independent scaling may be beneficial to the micro-service itself, but cause difficulties in integrating different micro-services. For example, a first micro-service may scale to a point where its communications to another micro-service overwhelm the resources of that other micro-service

DETAILED DESCRIPTION

Figure 1:
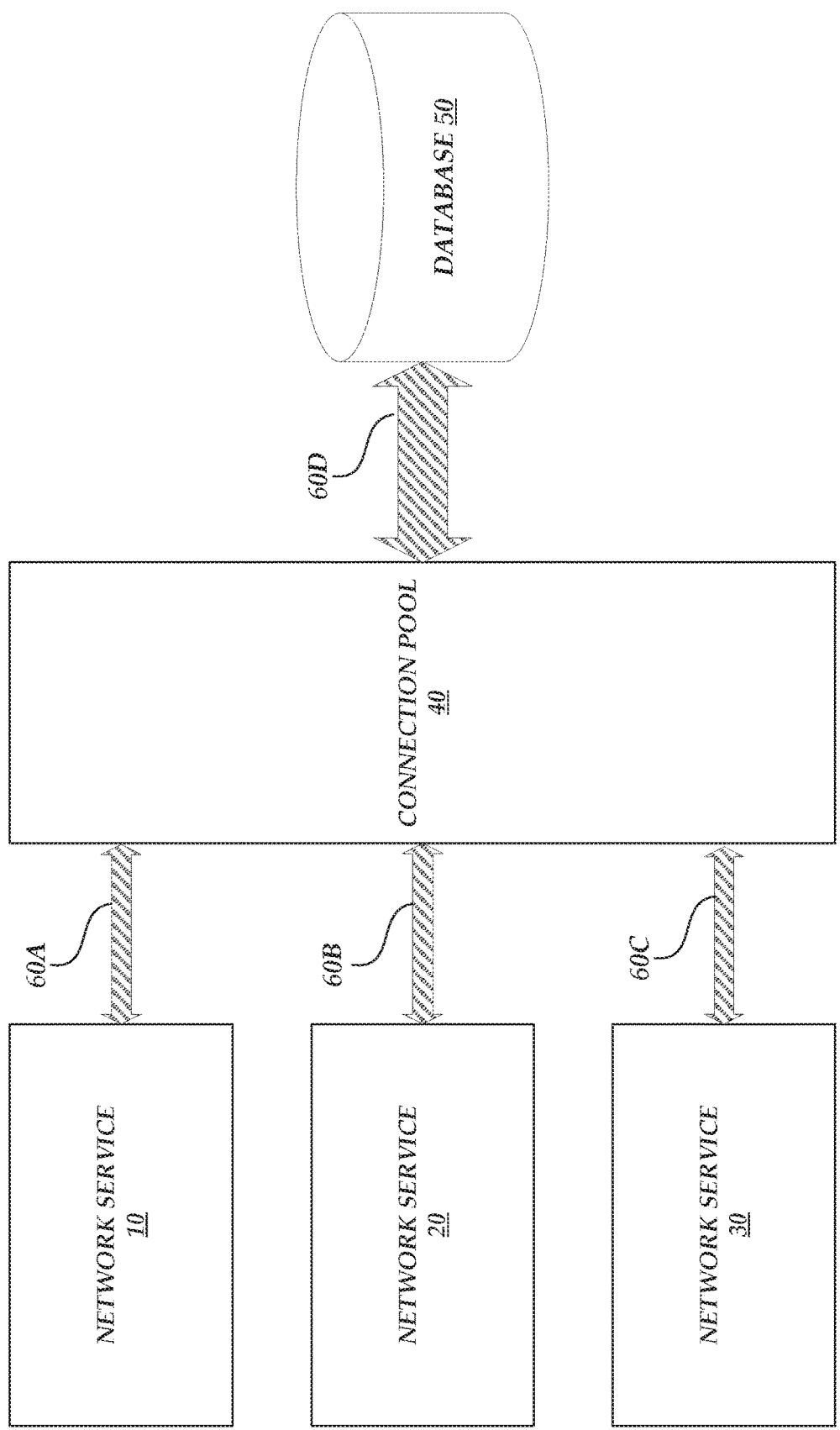
FIG. 1 is a block diagram depicting an illustrative logical flow of communications between network services and a database, as facilitated by a connection pool.

Generally described, aspects of the present disclosure relate to facilitating secure, scalable connections between network-based services (such as micro-services) by utilizing an intermediary connection pool provided by a connection management service. As disclosed herein, the connection pool may enable connections to the services on each "side" of the pool to be scaled independently, such that scaling of one service does not overwhelm another service. The connection pool may further provide for traversal of disparate networks hosting respective services, such that services can interact with one another via the pool as if they existed within a common network. Still further, the connection pool may provide a robust security model, by decoupling authentication between two services such that the services can authenticate with one another without requiring each service be provided with authentication information of the other service.

As an illustrative example, consider an instance in which a user stores information in a network-accessible database. The database may provide a limited number of connections, such that if attempts by other services to access the database exceed that number, no connection to the database is possible. Further, consider that the user may configure a second, highly-scalable service to access and utilize information from the database. For example, the second service may be implemented through an on-demand code execution system (sometimes referred to as a "serverless" system), which functions to execute user-defined code on an on-demand basis. If each execution of the user-defined code attempts to access the database, then instances of the second service can be expected to fail if executions of the user-defined code exceed the maximum number of connections provided by the database.

Connection pools provide a solution to this problem, by acting as a "middle man" between network services. For example, where a database has capacity for n connections, a connection pool may initiate n (or less than n) connections to the database. Others services can connect to the connection pool, and submit queries the pool for further submission to the database. In this manner, connections to the database can be expected not to exceed capacity of the database. Moreover, connections pools can provide a type of "over-subscription," such that more than n instances of a service can communicate with the database. For example, many database protocols are multi-phase, requiring a service to first open a connection to the database and later use the connection to interact with the database. Thus, a connection between a service and a database can limit other connections to the database, regardless of whether the connection is actively being used. A connection pool can address this issue, by reusing a given connection to a database for multiple accessing services, as required based on activity of the service. For example, each service may initiate a connection to the connection pool independently of the database. As queries are submitted to the connection pool, the pool may select an unused connection to the database, and submit the query to the database over that connection. So long as the number of active connections required by services does not exceed the number of possible connections to the database, the number of services connected to the pool (and thus, "connected" to the database from the point of view of the service) can scale nearly limitlessly.

One example of a logical flow of communications between network services and a database, as facilitated by a connection pool, is shown in FIG. 1. Specifically, in FIG. 1, a number of network services 10-30 are shown, each of which functions based on a connection 60 to a database 50. A volume of connections 60 of each service 10-30 is shown as a relative width of the connections 60, with the sum of the volumes of connections 60A-C exceeding a volume of connection 60D. Thus, while the database 50 may support a limited number of connections 60D, the connection pool 40 enables the connections 60A-C of the services 10-30 to exceed that limited number. This configuration is particularly desirable in instances where services 10-30 are configured to scale independently of the database 50.

One option in creating a connection pool 40 would be to manually configure a connection pool 40 for each database 50 (or other resource-limited service). For example, where the services 10-30 and database 50 are implemented in a hosted computing environment (sometimes referred to as a "cloud" computing environment), a user of that environment may also implement a connection pool 40, such as by provisioning a virtual machine instance with software providing the connection pool 40. However, user creation of connection pool 40 imposes significant disadvantages. For example, hosted computing environments often provide isolated networks to various services. Illustratively, a hosted computing environment may enable a user to configure a "virtual private network environment" or "virtual private cloud" ("VPC") such that computing devices included within the network are able to communicate with one another as if they were connected via a physical local area network (LAN). The database 50 of FIG. 1 may be included within such a VPC. If the network services 10-30 are not located within the VPC, use of a connection pool 40 would require that a user "pierce" the VPC boundary, enabling either the services 10-30 or the connection pool 40 to access the VPC.

Moreover, a user-configured connection pool 40 may generally require that the user handle authentication between the services 10-30, the connection pool 40, and the database 50. Illustratively, network services 10-30 may be required to store authentication information for the pool 40, and the pool 40 may be required to store authentication information for the database 50. This may lead to complex, duplicative, and potentially insecure storage of authentication information. For example, where a network service 10 is implemented as user-defined code executing on an on-demand code execution system, storing authentication information in the service 10 may require "hard-coding" a username and password for the service into the user-defined code, which is not generally considered a best practice for security. Moreover, this storage may be duplicative, as the services 10-30 themselves may already be authenticated in some manner. For example, where the services 10-30 are implemented within a hosted computing environment, the services 10-30 can be expected to be authenticated to the hosted computing environment by virtue of their being hosted in that environment. It would be desirable for the services 10-30 to utilize this existing authentication to authenticate to the pool 40, rather than requiring manual storage of additional authentication information.

Still further, manual user configuration of a connection pool 40 may require reconfiguration of network services 10-30 that utilize the pool. For example, a user may be required to modify each service 10-30 to direct requests to the pool 40, such as by modifying user-defined code for the service. Should changes to the pool 40 occur (such as scaling of the pool 40, relocation of the pool 40, etc.), the user may be required to modify each service 10-30 to reflect these changes.

The above-noted problems are addressed in embodiments of the present disclosure, at least partly by use of a connection manager service 150 configured to provide connection pools for hosted services (such as databases). The connection manager service 150 as disclosed herein can be tightly integrated with a hosted computing environment 110 hosting both source services accessing a connection pool and target services accessed by a connection pool. Due at least partly to this integration, the connection manager service 150 can address the problems described above, by enabling secure traversal of isolated networks of the environment, enabling reuse of existing authentication information for hosted services (thus negating a need to separately store authentication information at each service), and enabling programmatic reconfiguration of source services as modifications to the connection pool are made.

While embodiments of the present disclosure are discussed with respect to specific connection-limited services, such as database services, embodiments of the present disclosure can be used to provide connection pooling to any connection-limited network service. Moreover, techniques described herein may be applied to managing communications between a variety of network-based services, and in some cases may be applied outside of the context of connection pooling.

The foregoing aspects and many of the attendant advantages of this disclosure will become more readily appreciated as the same become better understood by reference to the following description, when taken in conjunction with the accompanying drawings.

Figure 2:
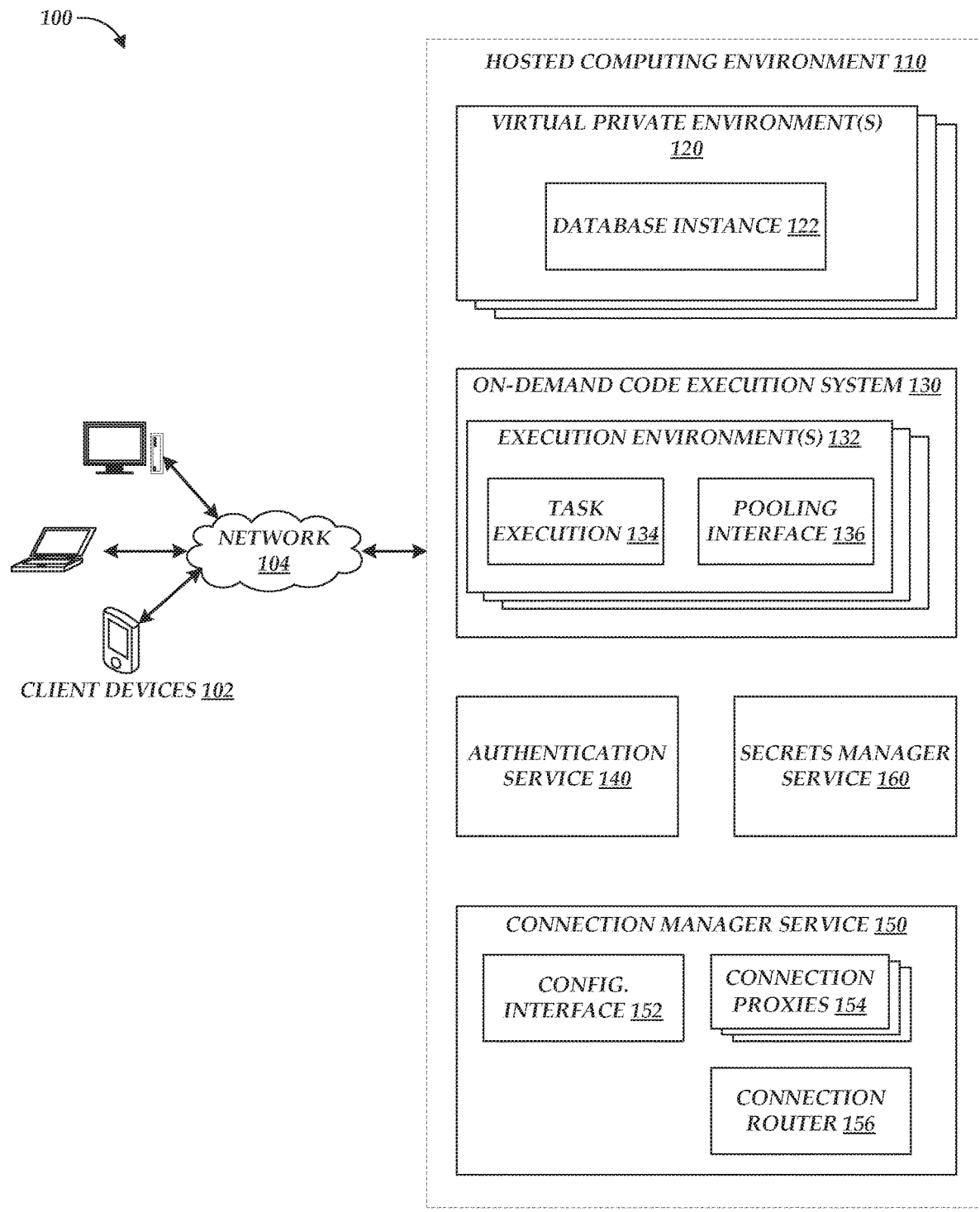
FIG. 2 is a block diagram depicting an illustrative environment in which a connection manager service may provide a connection pool to network-based services facilitating secure communications with another network-based service.

FIG. 2 is a block diagram of an illustrative operating environment 100 in which client devices 102 may interact with a hosted computing environment 110 via a network 104. By way of illustration, various example client devices 102 are shown in communication with the hosted computing environment 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The hosted computing environment 110 may provide the client devices 102 with one or more user interfaces, command-line interfaces (CLIs), application programing interfaces (APIs), and/or other programmatic interfaces for utilizing services provided by the hosted computing environment 110, including virtual private environments 120, an on-demand code execution system 130, an authentication service 140, and a secrets manager service 160. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the hosted computing environment 110.

The client devices 102 and hosted computing environment 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The hosted computing environment 110 is depicted in FIG. 2 as operating in a distributed computing environment including several computer systems that are interconnected using one or more computer networks (not shown in FIG. 2), which systems operate to provide the virtual private environments 120, on-demand code execution system 130, authentication service 130, connection manager service 150, and secrets manager service 160. Illustratively, the environment 110 includes a number of rapidly provisioned and released computing resources configured to provide the virtual private environments 120, on-demand code execution system 130, authentication service 130, connection manager service 150, and secrets manager service 160. The hosted computing environment 110 may also be referred to as a "cloud computing environment." Each of the virtual private environments 120, on-demand code execution system 130, authentication service 130, connection manager service 150, and secrets manager service 160 could also operate within a computing environment having a fewer or greater number of devices than are illustrated in FIG. 2. Thus, the depiction of the virtual private environments 120, on-demand code execution system 130, authentication service 130, connection manager service 150, and secrets manager service 160 in FIG. 2 should be taken as illustrative and not limiting to the present disclosure. For example, the elements of the environment 110 or various constituents thereof could implement various Web services components and/or peer to peer network configurations to implement at least a portion of the processes described herein. In some instances, two or more of the virtual private environments 120, on-demand code execution system 130, authentication service 130, connection manager service 150, and secrets manager service 160 may be combined into a single service. Each of the virtual private environments 120, on-demand code execution system 130, authentication service 130, connection manager service 150, and secrets manager service 160 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Within the hosted computing environment, the virtual private environments 120 represent virtual networking environments that are logically isolated from one another, as well as from other networks. Each environment 120 may include one or more virtual computing devices (e.g., virtual machines or VMs) provided by the environment 110 and configured to operate on behalf of a user, such as to provide a service. For example, an environment 120 of FIG. 2 is depicted as included a database instance 122, which instance 122 can be implemented by a specifically configured virtual computing device hosted within the environment 120 on behalf of a user.

While a database instance 122 is depicted in FIG. 2 as an example of a network-accessible service implemented by a device within a virtual private environment 120, the environments 120 may enable a wide variety of services. For example, the hosted computing environment 110 may enable client devices 102 request, obtain, configure, and manage different types of service instances, each of which represents a computing device (or portion of a computing device) configured to provide a service on behalf of a user. Each service instance may, for example, represent a physical computing device, a virtual computing device, a software container within a computing device, or a thread executing on a computing device. Each service instance may provide a network-accessible service, such as a database service, web hosting service, video transcoding service, or any of a wide variety of known network-accessible services. In one embodiment, a service instance, such as the database instance 122, provides a micro-service on behalf of a user. The hosted computing environment 110 can provide a variety of interfaces through which client devices 102 may configure service instances. For example, the hosted computing environment 110 may enable a client device 102 to specify a hardware configuration of each of their service instances (e.g., processing power, memory, etc.) and a software configuration (e.g., an operating system, applications, etc., which may illustratively be provided in the form of a device image provisioned to a disk drive accessible to an instance). The hosted computing environment 110 may further enable a client device 102 to specify how instances within environments 120 should be created, destroyed, or maintained. For example, a client device 102 may specify that an instance should be created or destroyed at certain times or according to certain conditions specified by a user.

A variety of techniques for hosting service instances within hosted computing environments are known in the art and thus the details of operation of the environment 110 to provide and manage service instances will not be discussed herein.

The hosted computing environment 110 is illustratively configured to enable devices within each virtual private environment 120 to interact with one another as if they were connected via a physical LAN. For example, where each device within an environment 120 is a virtual computing device hosted by a physical computing device, the hosted computing environment 110 may use virtual networking techniques to encapsulate traffic from the virtual computing devices, and pass that traffic over a substrate physical network connecting the physical computing devices. On receiving traffic from a first virtual device in an environment 120 over the substrate physical network, a physical device may decapsulate the traffic (e.g., strip away encapsulating headers to return the packet to its original state prior to encapsulation) and pass the traffic to another virtual device in the environment 120. Thus, devices in an environment 120 may communicate as if they connected within a physical LAN, even when geographically distant. A variety of techniques for implementing virtual networks between computing devices are known in the art and thus will not be described in detail herein.

In general, virtual private environments 120 are configured and operate on behalf of an individual user or set of users (e.g., an organization). In addition, the hosted computing environment 110 includes a number of additional services generally accessible by users. For example, the environment 110 includes an on-demand code execution system 130 enabling on-demand execution of user-defined code. The on-demand code execution system 130 may also be referred to as a serverless computing system. Embodiments for providing an on-demand code execution system 130 are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, the on-demand code execution system 130 can enable client devices 102 to submit executable code (e.g., source code) implementing desired functionality, which functionality is generally referred to herein as a "task." The system 130 can further enable a client device 102 to define one or more triggers that result in execution of the code on the system 130. For example, a client device 102 may request that each time a specific application programming interface (API) call is made, the code should be executed on the system 130. When a trigger occurs, the system 130 can configure an execution environment 132 for the code, which may correspond to a virtual machine instance, a software container, or other logically isolated environment in which code can execute. The system 130 can then execute the code within the environment 132, resulting in a task execution 134. When the task execution 134 completes, the system 130 can remove the environment 132, thus freeing computing resources for other task executions. The system 130 can thus enable a client device 102 to execute user-defined code on the system 130, without requiring the user to handle aspects of execution such as acquiring a computing device, provisioning the device with the code, etc.

In accordance with embodiments of the present disclosure, the execution environment 132 of FIG. 2 are further depicted as including a pooling interface 136. Generally described, the pooling interface 136 can represent code executing within an execution environment 132 and enabling a task execution 134 in that environment to interface with a connection manager service 150 (described in more detail below). In one embodiment, the pooling interface 136 corresponds to code executed within an environment 132 of a task execution 134, which can be interfaced with in a manner similar to the service for which a connection pool is implemented (e.g., the database instance 122). For example, where the database instance 122 is a MYSQL™ database accessed via a transmission control protocol (TCP) server, the pooling interface 136 can act as a proxy for the MYSQL TCP server, by implementing a corresponding TCP server that accepts transmissions in a manner similar or identical to that of the MYSQL TCP server. As will be described in detail below, on receiving a communication from a task execution 134, the pooling interface 136 may encapsulate the transmission with additional information enabling appropriate handling of the transmission on within the environment 110, and submit the encapsulated transmission to the connection manager service 150 for eventual delivery to the database instance 122.

Use of a pooling interface 136 may illustratively simplify generation of tasks by client devices 102, by simplifying code that must be authored by a user. For example, each task execution 134 may result in a corresponding pooling interface 136 being implemented by the system 130, creating a one-to-one correspondence between task execution 134 and pooling interface 136. This correspondence can enable each task execution 134 to locally reference a respective pooling interface 136 for that execution 134, such that the execution 134 need to be programmed to rely on external services to interface with a database instance 122. For example, code of a task may be configured to interact with a database at a "localhost" address, thus giving the appearance (from the point of view of a task execution 134) that a database exists locally. As discussed below, the pooling interface 136 may also facilitate authentication to a connection pool for the instance 122, further simplifying code for a task.

In one embodiment, code implementing the pooling interface 136 is provided by an operator of the on-demand code execution system 130, and may be associated with a task by inclusion of a reference to such code within user-defined code for a task. In this manner, the pooling interface 136 may be considered a "dependency" for a task, such that each task execution 134 results in execution of a corresponding the pooling interface 136. Implementation of task dependencies on an on-demand code execution system is discussed in more detail in U.S. patent application Ser. No. 15/841,143, entitled "DEPENDENCY HANDLING IN AN ON-DEMAND NETWORK CODE EXECUTION SYSTEM," the entirety of which is incorporated by reference herein.

While execution environments 132 are depicted as within the on-demand code execution system 130, in some instances the system 130 may be configured to create and manage such environments 132 within a virtual private environment 120 (e.g., when executing a task owned by an owner of that environment 120). The environment 120 in which a task is executed may differ from the environment 120 in which a network-accessible service accessed by the task is hosted.

To facilitate interaction with the hosted computing environment 110, the environment 110 further includes an authentication service 140 enabling client devices 102 to authenticate to services within the environment 110, such as to create virtual private environments 120 or devices within the environments 120, to create or trigger tasks on the on-demand code execution system 130, and the like. Authentication services 140 are known in the art, and thus operation of the service 140 will not be described in detail herein. However, in brief, a client device 102 may authenticate to the service 140 using a set of authentication information (e.g., a username and password), and the authentication service 140 may return other authentication information, such as an authentication token, to the client 102. The authentication token may then be provided from the client device 102 to other devices to authenticate the client device 102 to the other devices (which devices may verify the token by, for example, passing the token to the service 140 for verification). Services implemented on behalf of a client device 102, such as a database instance 122 or task execution 134 may be authenticated with the authentication service 140 on initiation within the environment 110. For example, a task execution 134 occurring at the request of the client device 102 may be provided, on initialization, with an authentication token identifying the task execution 134 as executing on behalf of the client device 102.

In accordance with embodiments of the present disclosure, the hosted computing environment 110 further includes a connection manager service 150 configured to provide connection pools to services on the environment 110, such as a database service provided by the database instance 122. Each connection pool is provided by one or more connection proxies 154, each of which illustratively represents a computing device configured to receive network traffic on behalf of a network service (e.g., the database instance 122) and to transmit the traffic to the network service over a fixed number of connections to the service. In one embodiment, connection proxies 154 may each be "single-tenanted" and configured to provide a connection pool to a single network service. In another embodiment, connection proxies may be "multi-tenanted" and configured to provide connection pools for multiple services. In some cases, single tenanted proxies 154 may be preferable for their increased security. For example, a proxy 154 providing a connection pool for the database instance 122 may be configured to interact with the instance 122 as if the proxy 154 were part of the virtual private environment 120. Single-tenancy may help to ensure that only appropriate traffic is routed to that environment 120 (which may occur, for example, if a multi-tenanted proxy 154 transmitted traffic to the incorrect environment 120, such as due to misconfiguration or malicious traffic).

To assist in routing traffic to the connection proxies 154, the connection manager service 150 further includes a connection router 156 implementing a "routing layer" for the service 150. The connection router 156 illustratively acts as a known endpoint for services to attempt to communicate with a connection proxy 154. On receiving traffic relate to a specific connection pool, the connection router 156 can identify one or more proxies 154 providing the pool and pass the traffic to the proxies 154. In some instances, the connection router 156 may authenticate traffic before passing the traffic to a proxy 154.

Still further, the connection manager service 150 includes a configuration interface 152. The interface 152 may provide a "control plane" for the connection manager service 150, enabling client devices 102 to create, configure, and delete connection pools for services. For example, the interface 152 may enable a client device 102 to create a connection pool for the database instance 122, and to specify to the connection manager service 150 configuration information for the pool, such as an identifier of the instance 122, authentication information to be used to access the instance 122, and a number of maximum connections to the instance 122.

As shown in FIG. 1, the hosted computing environment 110 further includes a secrets manager service 160, configured to securely store confidential information, such as authentication information. Illustratively, the secrets manager service 160 may provide a centralized location for a user to store sensitive information, such that any changes to that information (e.g., rotating a password), auditing of information, and the like need only occur at a single location.

In accordance with embodiments of the present disclosure, the secrets manager service 160 may be configured by a client device 102 to store authentication information for a service associated with a connection pool, such as the database instance 122. Connection proxies 154 can be configured to securely interact with the secrets manager service 160 to obtain the authentication information prior to connecting to the database instance 122, and to append that authentication information to traffic received at a connection pool as appropriate to enable the traffic to interact with the instance 122. Thus, use of connection proxies 154 and secretes manager service 160 can enable other services, such as task executions 134, to access the database instance 122 without requiring the services to themselves store authentication information for the database instance 122. In one embodiment, services, such as task executions 134, authenticate to the connection manager service 150 based on authentication information passed to the service at a time of initialization. For example, when a task execution 134 is triggered on behalf of a client device 102, an authentication token can be passed to the execution 134, which the execution 134 can use to authenticate with the connection manager service 150. The service 150, in turn, can retrieve authentication information for the database instance 122 from the secrets manager service 160 and use that authentication information to enable communications between the task execution 134 and the database instance 122. The task execution 134 therefore need not store the authentication information, increasing security of the database instance 122.

Figure 3:
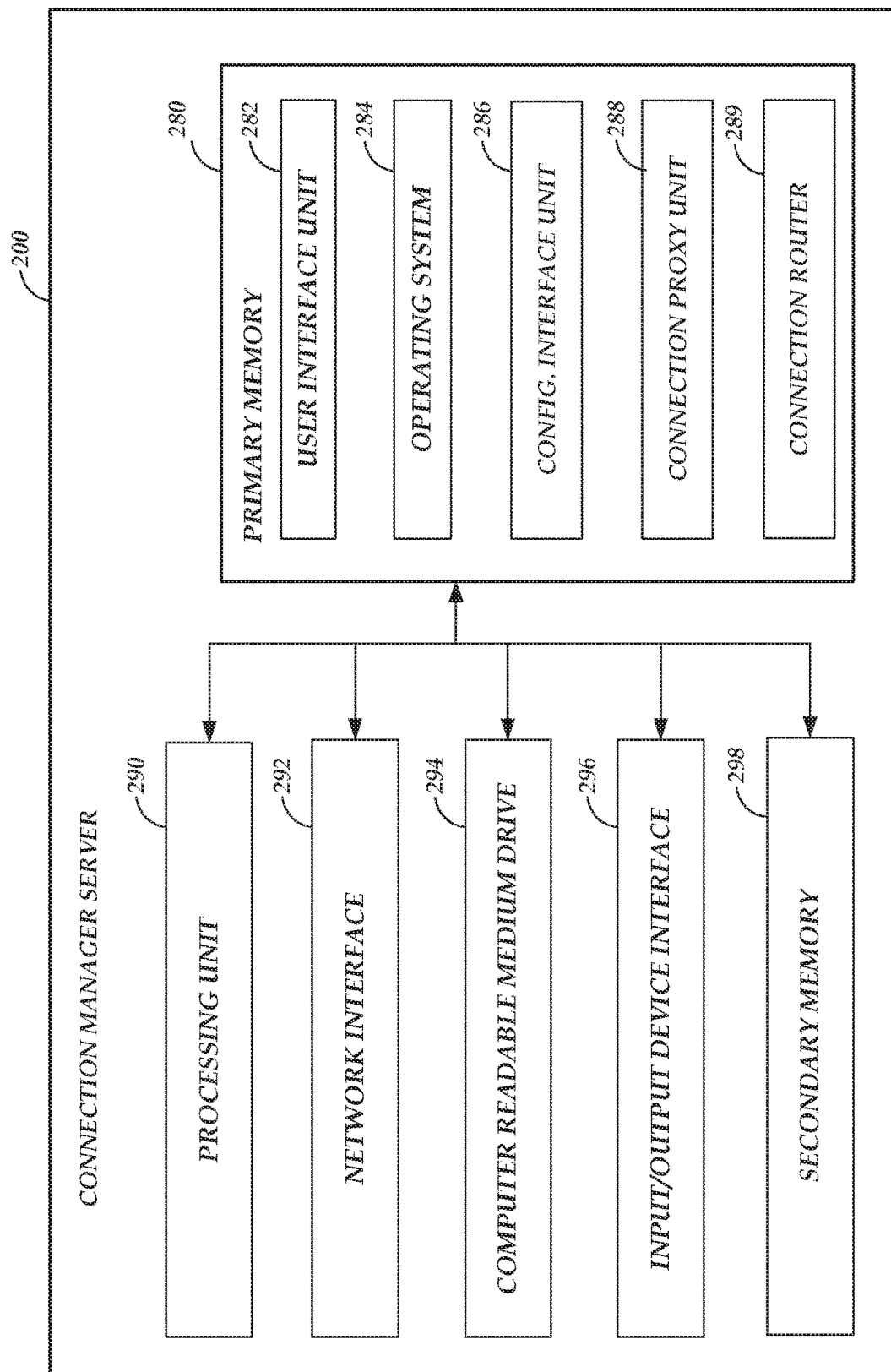
FIG. 3 depicts a general architecture of a computing device providing the connection manager service 150 of FIG. 1.

FIG. 3 depicts a general architecture of a computing system (a connection manager server 200) implementing the connection manager service 150 of FIG. 12 The general architecture of the server 200 depicted in FIG. 3 includes an arrangement of computer hardware and software that may be used to implement aspects of the present disclosure. The hardware may be implemented on physical electronic devices, as discussed in greater detail below. The server 200 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 2.

As illustrated, the server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 3 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the server 200, with a higher speed but lower total capacity than secondary memory 298.

The primary memory 280 may store an operating system 284 that provides computer program instructions for use by the processing unit 290 in the general administration and operation of the server 200. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device.

In addition to and/or in combination with the user interface unit 282, the memory 280 may include a configuration interface unit 286, a connection proxy unit 288, and a connection router unit 289, each of which represents code executable to implement a configuration interface 152, connection proxy 154, and connection router 156 of FIG. 3, respectively.

The server 200 of FIG. 3 is one illustrative configuration of such a device, of which others are possible. For example, while shown as a single device, a server 200 may in some embodiments be implemented as multiple physical host devices. In other embodiments, the server 200 may be implemented as one or more virtual devices executing on a physical computing device. While described in FIG. 3 as a server 200, similar components may be utilized in some embodiments to implement other devices shown in the environment 100 of FIG. 3.

Figure 4:
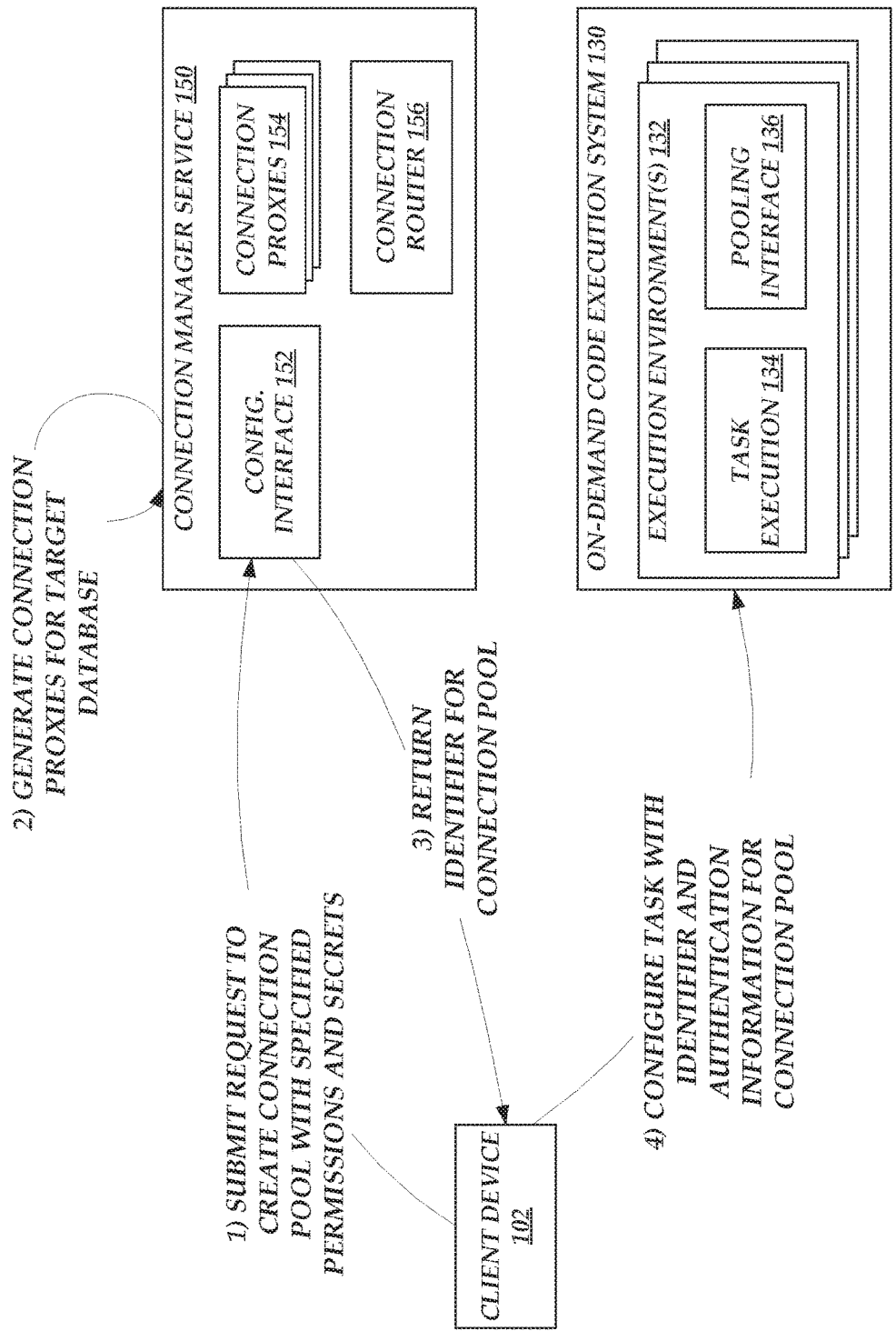
FIG. 4 is a flow diagram depicting illustrative interactions for configuring the connection manager service 150 of FIG. 1 to provide a connection pool for a first network-based service, and for configuring a second network-based service to communicate with the first service via the connection pool.

With reference to FIG. 4, illustrative interactions will be described for configuring the connection manager service 150 to provide a connection pool for a connection-limited service, such as the database instance 122. The interactions begin at (1), where a client device 102 submits to the configuration manager 152 a request to creation a connection pool for the instance 122. The request may include information pertaining to how the connection pool interacts with the instance 122. For example, the request may include a maximum number of connections to the instance 122 and an identifier of a secret (e.g., as stored on the secrets manager service 160) to use to access the instance 122. In addition, the request may specify how other devices may access the connection pool. For example, the request may specify permissions for the connection pool, such as an account, identity, or "role" (also referred to herein as an "authentication role") with permissions to access the connection pool. In some instances, the request may further specify information relating to a format of communications flowing through the connection pool, such as a wire protocol used by the database instance 122. Illustratively, knowledge of the wire protocol used by the database instance 122 may enable the connection manager service 150 to more accurately detect a state of a connection flowing through the pool (e.g., as active or idle). For example, specific wire protocols (such as commonly used database wire protocols) may include commands indicative of an active (or idle) connection, and thus the connection manager service 150 may be configured to inspect communications across the connection pool to determine whether a connection between a source device (e.g., a service requesting access to the connection pool) and the database instance 122 is active or idle.

On receiving the request, the connection manager service 150, at (2), generates one or more connection proxies 154, which operate to provide the connection pool. Illustratively, the connection manager 150 may generate a virtual computing instance and provision the instance with software enabling the instance to accept connections from source devices and pass queries (or other data) received from source devices to the database instance 122 in accordance with embodiments of the present disclosure. In one embodiment, the connection proxies 154 are generated by the service 150 such that they are enabled to communicate with the instance 122. For example, the service 150 may include the proxies 154 in the virtual private environment 120 of the instance 122 or otherwise modify the environment 120 to enable communications from the proxies to reach the instance 122.

At (3), the configuration interface 152 returns to the client device 102 an identifier for the connection pool, which identifier may thereafter be used by source services to access the database instance 122 via the connection pool. In one embodiment, the identifier is a globally or universally unique identifier (a "GUID" or "UUID"). In another embodiment, the identifier is unique to an account of the client device 102 on the hosted computing environment 110, and a combination of an account identifier of the account and the identifier of the connection pool form a globally unique identifier.

While the client device 102 may thereafter configure any number of (appropriately authenticated) services to access the instance 122, connection pooling may be particularly beneficial in rapidly scalable and/or transient source services, such as services provided by task executions 134 on the on-demand code execution system 130. Thus, FIG. 4 depicts interactions enabling such a task execution 134 to access the database instance 122 through the connection pool provided by the service 150.

Specifically, at (4), the client device 102 interacts with the on-demand code execution system 130 to configure a task (e.g., the code that when executed results in task execution 134) with the identifier of the connection pool, as well as specifying an account, identifier, or role for the task that enables the task to connect to the connection pool. The identifier and role information may be stored as metadata associated with the task, rather than within user-defined code for the task. Thus, modification of a connection pool identifier and/or role may not require modification of the user-defined code. When executing a task, the system 130 may, in addition to executing the user-defined code as a task execution 134, implement a pooling interface 136 within an environment 132 of the task, and configure the pooling interface 136 to include an identifier of the task. The pooling interface 136 may be provided with authentication information for the user-specified role, such that the interface 136 can provide the authentication information to the service 150 to authenticate itself. Thereafter, the pooling interface 136 may operate to receive communications from the task execution 134, and to submit them to the service 150 in an authenticated manner that also identifies the connection pool.

For example, as will be described in more detail below with respect to FIG. 6A, the pooling interface 136 may represent a TCP server that receives network transmissions from the task execution 134 according to a wire protocol also used by the database instance 122. On receiving such a transmission, the interface 136 may encapsulate the transmission with additional information, such as authentication information and an identifier of the connection pool, and transmit the encapsulated transmission to the connection service 150 (e.g., to a router 156). The service 150 may utilize the additional information to authenticate the transmission, and to route the request to an appropriate connection proxy 154. The proxy 154 may then decapsulate the transmission and pass the transmission to the database instance 122. Thus, from the perspective of the user-defined code executing as the task execution 134, database queries may be submitted to a local endpoint (the interface 136), without requiring authentication and without apparent reliance on external services. This model therefore greatly simplifies creation of tasks, and enables high scalability of tasks on the system 130.

Figure 5:
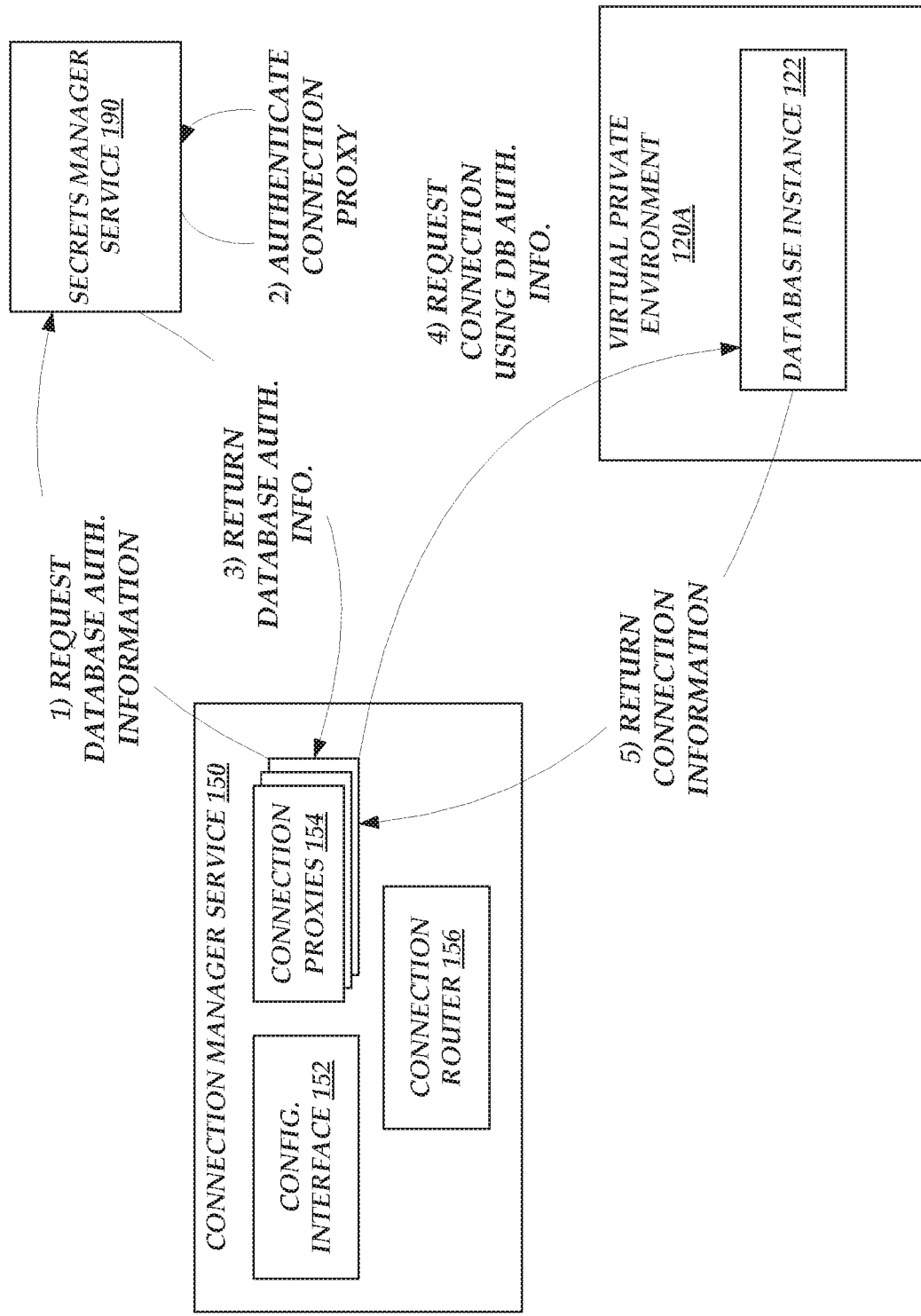
FIG. 5 is a flow diagram depicting illustrative interactions for securely initiating connections between a connection pool provided by the connection manager service 150 of FIG. 1 and a network-based service to which the pool provides access.

With reference to FIG. 5, illustrative interactions will be described securely initiating connections between a connection pool provided by the connection manager service 150 of FIG. 1 and a network-based service to which the pool provides access (e.g., the database instance 122). As discussed above, a connection pool implemented by connection proxies 154 may facilitate interaction with the database instance 122 by enabling source devices to submit queries to the pool, which are then passed to the instance 122 via an idle connection between the pool and the instance 122. Thus, the interactions of FIG. 5 can enable a connection proxy 154 to create a secure connection to the instance 122. In one embodiment, the interactions of FIG. 5 occur at initialization of the connection pool. For example, where the pool is configured to provide n connections to the instance 122, the proxies 154 providing the pool may establish those connections on initialization, such that subsequent attempts to transmit information to the instance 122 can utilize the pre-established connections. In another embodiment, the interactions of FIG. 5 occur on an as-needed basis. For example, the proxies 154 of a pool may establish a connection to the instance 122 when there is no existing idle connection to the instance 122. In some embodiments, the interactions of FIG. 5 may occur both on initialization of a proxy 154 and on an as-needed basis. For example, a pool may be configured with both a minimum and maximum number of connections to a service, such as the database instance 122. On initialization, a proxy 154 hosting a pool may undertake the interactions of FIG. 5 in order to establish the specified minimum number of connections for the pool. Thereafter, the proxy 154 may repeat the interactions of FIG. 5 on an as-needed basis, until the maximum number of connections is reached.

For the purposes of description, it will be assumed that the database instance 122, like many network-accessible services, requires clients to authenticate with the instance 122 prior to establishing a connection. Rather than storing authentication information for the instance 122 at the service 150, a user may elect to store such information in a secure, centralized location, like that provided by the secrets manager service 160. Thus, prior to establishing a connection to the instance 122, the proxies 154 providing a pool can interact with the secrets manager service 160 to obtain authentication information for the instance 122.

Specifically, at (1), the proxies 154 request the authentication information from the secrets manager service 160. At (2), the service 160 authenticates the requesting proxies 154. In one embodiment, the service 160 may authenticate the proxies 154 based on an authentication token provided to the proxies 154 on initialization. For example, when creating a connection pool, a client device 102 may specify an identity or "role" to be assumed by devices providing the pool. On initialization, proxies 154 may be provided with authentication information (e.g., a token) identifying their use of that role, which information may be passed to the secrets manager service 160. The service 160 may then authenticate the proxies 154 using the provided information (e.g., by passing the token to the authentication service 140 and requesting verification of the token). After authentication, the service 160, at (3), returns to the proxies 154 the authentication information for the database instance 122 (e.g., a username and password).

Thereafter, at (4), the proxies 154 utilize the authentication information for the database instance 122 to request a connection to the instance. Illustratively, the connection may be a MySQL protocol connection. The database instance 122 then, at (5), returns the connection information to the proxies 154, thus establishing a connection between the instance 122 and the one or more proxies 154 providing a connection pool for the instance 122. The connection may illustratively be encrypted to secure communications between the proxies 154 and the instance 122. For example, the connection may utilize transport layer security (TLS) (or its predecessor, secure sockets layer (SSL)). Moreover, the connection may logically occur within a virtualize network of the virtual private environment 120, further securing the connection.

While shown as two interactions in FIG. 5, various protocols may require additional interactions between the proxies 154 and the instance 122 to establish a connection. For example, particular wire protocols may define a multi-step "handshake" enabling the proxies 154 and instance 122 to exchange information for the connection. As will be described below, the connection between proxies 154 and the instance 122 may thereafter be used to pass queries from source services, such as task executions 154 to the instance 122. Notably, because authentication between the proxies 154 and instance 122 occurs independently of source services, the proxies 154 can also be viewed as "authentication proxies" for source services, allowing those services to utilize other authentication information (such as information gained by virtue of creation of the service on the hosted computing environment 110) to access the connection pool, while utilizing database-specific authentication information (e.g., from the secrets manager service 160) to connect to the instance 122.

Figure 6A:
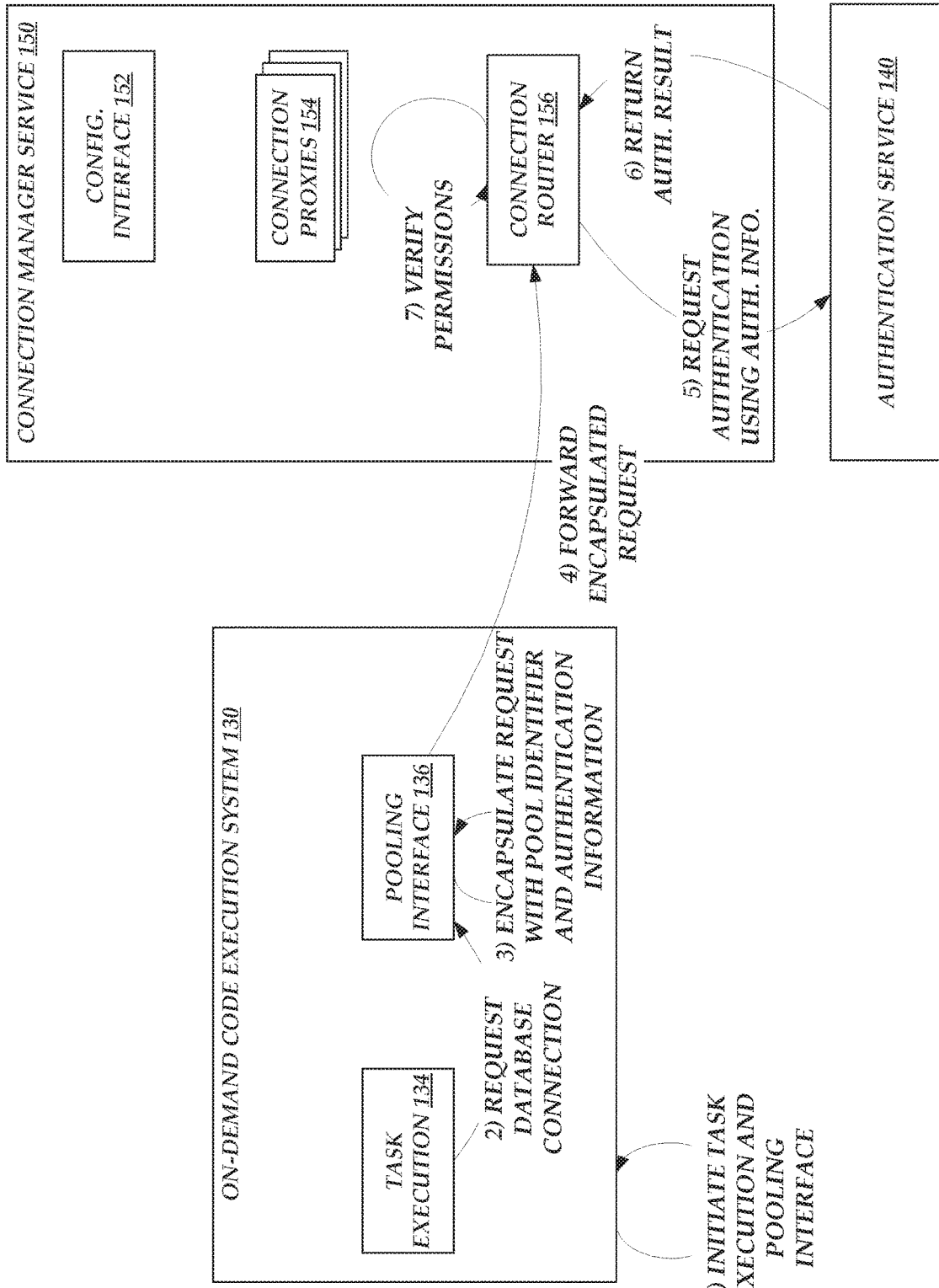
FIGS. 6A and 6B are flow diagrams depicting illustrative interactions for initiating a connection between the connection manager service 150 of FIG. 1 and a network-based service attempting to utilize a connection pool provided by the connection manager service 150.
Figure 6B:
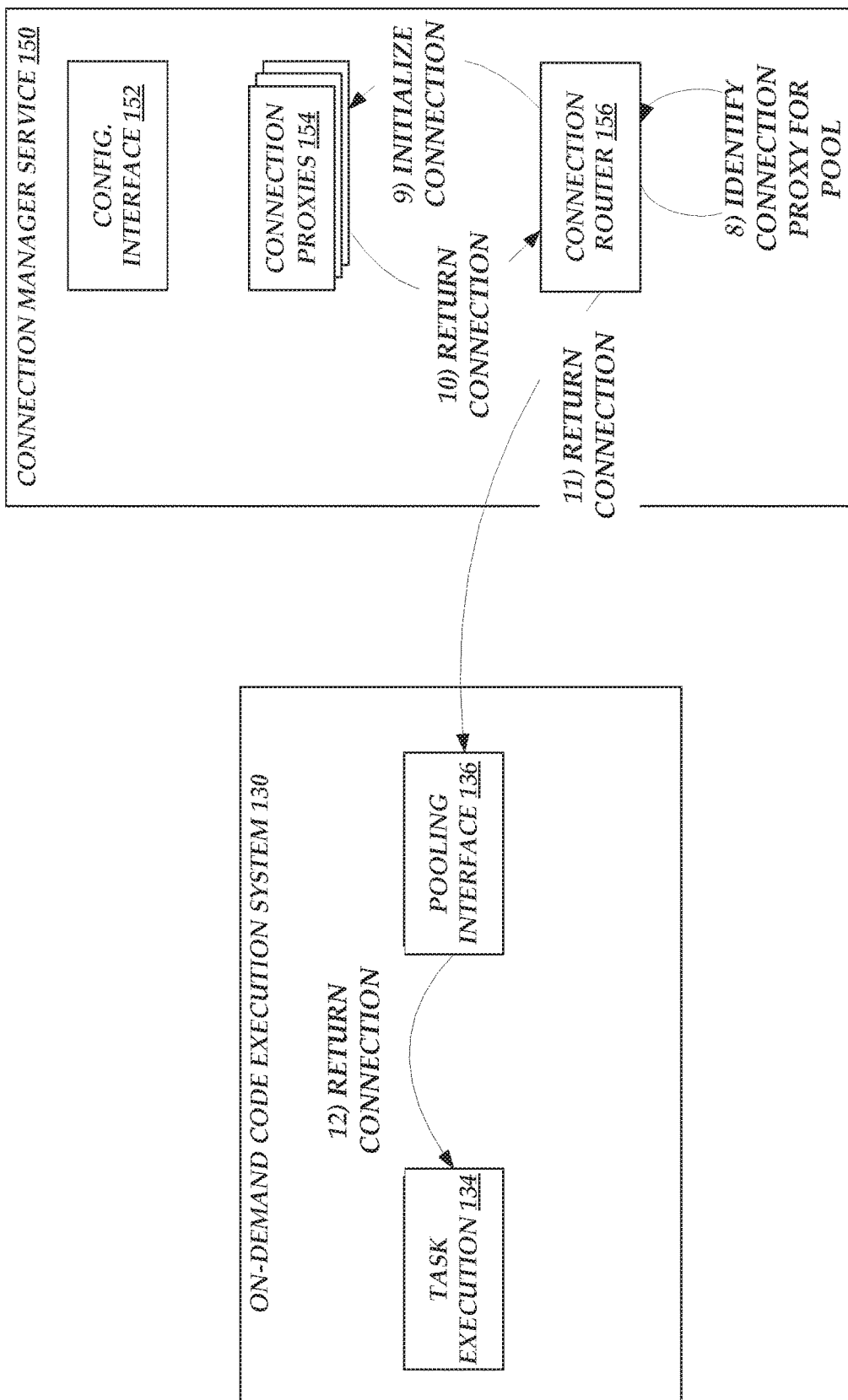

FIGS. 6A and 6B are flow diagrams depicting illustrative interactions for initiating a connection between the connection manager service 150 and a network-based service, such as the task execution 134 on the on-demand code execution system 130, attempting to utilize a connection pool provided by the connection manager service 150.

The interactions of FIG. 6A begin at (1), where the system 130 initiates the task execution 134. As discussed above, the task execution 134 generally represents execution of user-defined code, and can be triggered based on a variety of criteria monitored by the system 130. For example, the system 130 may initiate the task execution 134 based on a call received from a client device 102. In addition to initiating the task execution 134, the system 130 also initiates the pooling interface 136. In one embodiment, the system 130 initiates the pooling interface 136 based on a reference to the interface 136 within code of the task. For example, the user-defined task code (or metadata for the task) may contain an "include" statement referring to code of the pooling interface 136, thus causing the system 130 to execute the interface 136 along with the task. In one embodiment, the pooling interface 136 is executed in a common execution environment as the task, thus enabling the task to utilize a relative network identifier for the pooling interface 136, such as the "localhost" identifier. In another embodiment, the pooling interface 136 is executed in a separate execution environment. For example, the pooling interface 136 may be implemented as a "sidecar VM instance" as disclosed in U.S. patent application Ser. No. 16/017,970, entitled "EXECUTION OF AUXILIARY FUNCTIONS IN AN ON-DEMAND NETWORK CODE EXECUTION SYSTEM," the entirety of which is hereby incorporated by reference.

At (2), the task execution 134 transmits to the pooling interface 136 a request to connect to the database 122. In one embodiment, because the task execution 134 utilizes the pooling interface 136 rather than attempting to directly connect to the database 122, the task execution 134 need not specifically identify the database 122 within the request. Moreover, because the connection manager service 150 is configured to authenticate calls to the database based on authentication information provided by the on-demand code execution system 130 in initiating the task execution 134, the task execution 134 need not specify authentication information for the database within the request. As such, the format of the request is greatly simplified. For example, where the task execution 134 represents executing Python code (e.g., formatted according to the Python 2.6 standard) and the database 122 is a MySQL database, the code may include a statement such as 'mydatabase=mysql.connector.connect(host="localhost", user=" ", passwd=" ")', where 'mydatabase' is a handle to the connection, "mysql.connector" is a MySQL-provided class containing functions related to MySQL databases, and the "connect" function is a function attempting to initiate a connection to a MySQL database, which function is passed a "host" variable identifying "localhost" as a location of the database, and "user" and "passwd" variables specifying no authentication information for the database. The request is illustratively transmitted via the TCP protocol to a TCP server implemented by the pooling interface 136.

While embodiments of the present disclosure may remove a need to specify an identifier of a connection pool within the request of interaction (2), in some instances it may be beneficial to enable that identifier to be specified by a task execution 134. For example, the on-demand code execution system 130 may enable a task to be associated with multiple network-accessible, connection-limited services, each accessible via a distinct connection pool. The system 130 may further provide a pooling interface 136 for each such pool. To facilitate distinguishing between interfaces 136 for the respective pools, the on-demand code execution system 130 may provide an API enabling resolution of an identifier of a given connection pool into access information for an interface 136 of the pool. For example, the system 130 may provide a function to a task such as "getPoolAddress" which takes as a parameter a pool identifier, and which when invoked returns a network address and port number of the interface 136 for that pool. Thus, a task may call the getPoolAddress function to obtain an address and port number for a given pool, and insert that address and port into the "host" field of a connect function (or similar database function) in order to request a database connection from the pooling interface 136. Notably, connecting to a service in this embodiment may require only specification of an identifier of the service within code of the task, without requiring, for example, authentication information of the service or knowledge of a network location at which the service is implemented to be hard-coded within task code.

On receiving the request, at (3), the pooling interface 136 adds to the request additional information to be utilized by the connection manager service 150 in routing and processing the request. Specifically, the service 150 adds information specifying at least an identifier for the connection pool of the database instance 122 and authentication information to be used by the service 150 to authenticate the request. Both of the above-noted items of information may be supplied to the pooling interface 136 by the system 130, such as on initialization of the interface 136. For example, as discussed above, a client device 102 may configure a task with metadata specifying a role of the task and an identifier of a connection pool for the database instance 122. Thus, on initiating the task execution 134, the system 130 may pass the identifier and an authentication token (or other authentication information) to the interface 136. In one embodiment, the pooling interface 136 adds the above-noted information by use of network encapsulation techniques, by encapsulating the original request (e.g., in the form of a TCP packet) with an additional header specifying the above-noted information. Use of encapsulation may beneficially reduce or eliminate the need to modify the packet as transmitted by the task execution 134.

At (4), the pooling interface 136 forwards the encapsulated request to the connection router 156. As noted above, the router 156 can generally function to authenticate transmissions from pooling interfaces 136, and to route those transmission to a connection proxy 154 providing a connection pool for a service, such as the database instance 122.

Accordingly, at (5), the connection router 156 requests from the authentication service 140 authentication of the pooling interface 136 based on the authentication information provided by the interface 136 within the request. For example, the connection router 156 may submit to the authentication service 140 a request to validate an authentication token provided by the pooling interface 136. The authentication service 140, at (6), evaluates the authentication information and returns an authentication result to the connection router 156. Illustratively, the authentication service 140 may verify or determine a role associated with the authentication token, and notify the connection router 156 that the interface 136 is authenticated as that role.

In addition, the router 156, at (7), verifies that the role to which the interface 136 has been authenticated has permissions to access the connection pool identified within the request (e.g., based on permissions for the pool specified by a client device 102). Should authentication of verification of permissions fail, the router 156 can notify the interface 136 of the failure, which may for example generate an error within a log of the task execution 134. However, for the purposes of description of FIGS. 6A-B, it will be assumed that the authentication result indicates successful authentication of the pooling interface 136, and that the router 156 verifies that the role of the interface 136 has appropriate permissions to access the connection pool for the database instance 122.

The interactions of FIG. 6A are continued in FIG. 6B, where, at (8), the connection router 156 identifies a connection proxy 154 providing a connection pool for the database instance 122. In one embodiment, the connection router 156 may maintain a mapping of identifiers to proxies 154, such as in a data store of the connection manager service 150. In cases where the pool is provided by multiple proxies 154, the router may in some embodiments select between the proxies 154 based on load balancing criteria. In another embodiment, the connection router 156 may utilize the domain name system (DNS) to identify the connection proxy 154. For example, each connection proxy 154 providing a given pool may register with a DNS server (not shown in FIG. 6B) to associate an address of the proxy 154 to a domain name corresponding to an identifier of the connection pool (e.g., "pool ID. connectionmanagerservice-.hostedenvironment.tld"). The router 156, on receiving a request, may thus generate the domain name based on the identifier, and interact with a DNS server to resolve the domain name into a network address of a proxy 154 providing the identified connection pool. The DNS server may, instances where a pool is provided by multiple proxies 154, conduct DNS-based load balancing, such as by resolving a domain name of the connection pool into an address of one or more proxies 154 selected based on their load.

On identifying a proxy 154 providing the identified connection pool, the router 156 initializes a connection with the proxy 154, at (9). The proxy 154, in turn, responses to the router 156 indicating a successful connection. The router 156 thus indicates a successful connection to the interface 136, which indicates a successful connection to the task execution 134. In one embodiment, each of the connections between the respective task execution 134, interface 136, router 156 and proxy 154 is an encrypted connection, such as a TLS-compliant TCP connection. In some instances, additional interactions, such as multi-phase handshake, may occur between these components during establishment of a connection.

While FIGS. 6A and 6B are described with respect to specific mechanisms of augmenting a request for a network service at a pooling interface 136, embodiments of the present disclosure may be utilized to augment service requests (e.g., requests for operations) with a variety of information. For example, in addition to authentication information, requests may be augmented with a variety of types of state information for a task execution 134, which may vary during a task execution or across executions. Such state information may include, e.g., permissions information for a task execution (e.g., network resources to which the execution has access permissions), a current real (e.g., "wall clock") time as maintained at the execution, a running time of the execution, a network location of the execution, etc. In addition to an identifier of a connection pool, requests may additionally or alternatively be augmented with a variety of types of metadata, any of which may be specified by an owner of a task during configuration of the task on the system 130. By augmenting requests with state information and/or metadata, the need to hard-code such information into code of the task is reduced or eliminated. Moreover, by utilizing a pooling interface 136 to augment requests, such as via encapsulation, the code of the task may remain compatible with existing libraries or code packages not necessarily intended for use in the system 130 (e.g., code or libraries that expect a particular wire protocol, which may be intended for use within a local network, use outside a connection manager service 150 or on-demand code execution system 130, etc.). Thus, portability of code is increased relative to conventional techniques.

Figure 7:
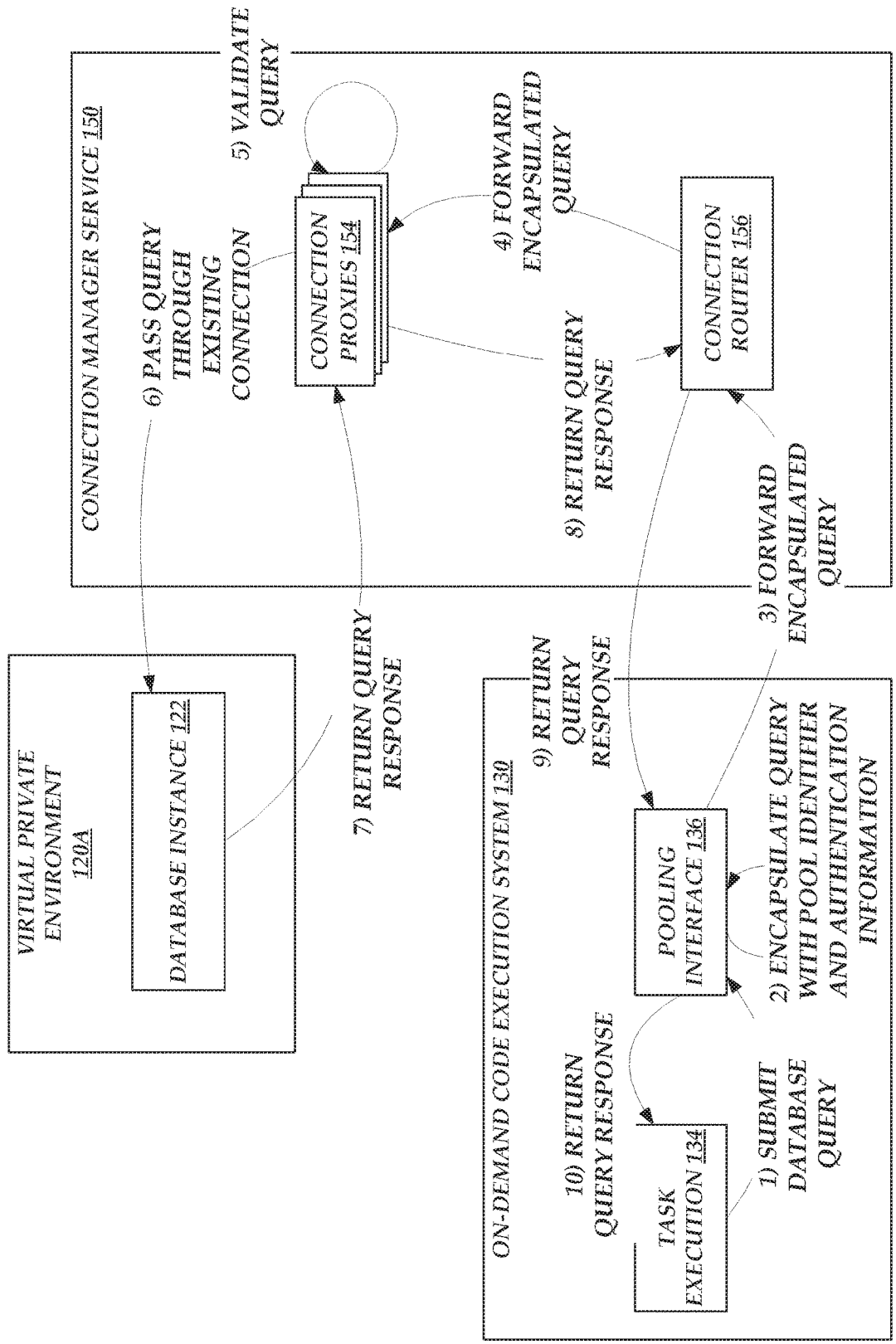
FIG. 7 is a flow diagram depicting illustrative interactions for securely communicating between a first and second network-based service utilizing a connection pool provided by the connection manager service 150 of FIG. 1.

FIG. 7 is a flow diagram depicting illustrative interactions for securely communicating between a first and second network-based service (e.g., the system 130 hosting the task execution 134 and the database instance 122) utilizing a connection pool provided by the connection manager service 150 of FIG. 1. The interactions of FIG. 7 are assumed for purposes of discussion to occur subsequent to connections being established between the elements of FIG. 7 (e.g., the execution 134 and the interface 136, the interface and the router 156, etc.). Thus, at (1), the task execution 134 submits a database query to the pooling interface 136 via the connection. Submission of the query may correspond for example, to execution of a statement in code such as mydatabase.cursor( )execute("SHOW TABLES")', where "mydatabase" is a handle to a MySQL database connection, "cursor( )" 0 is a function that returns a "MySQLCursor" class object that executes operations against a database, and "execute" is a function that instructs to execute the operation passed to that function (e.g., "SHOW TABLES," an SQL command to list tables in a database). While FIG. 7 is discussed with respect to queries, a task execution 134 may execute any number of operations against a database.

At (2), on receiving the request from the task execution 134, the pooling interface 136 adds to the query an identifier of the connection pool for the database 122 and authentication information of the task execution 134. As noted above, both of the above-noted items of information may be supplied to the pooling interface 136 by the system 130, such as on initialization of the interface 136. In the embodiment shown in FIG. 7, the interface 136 adds the information by encapsulating the query (e.g., as received in the form of a TCP packet) with a new header specifying the information.

At (3), the interface 136 transmits the encapsulated query to the connection router 156, which at (4) forwards the query to the proxy 154 identified as providing the connection pool identified within the request (e.g., identified according to the interactions of FIGS. 6A and 6B, discussed above).

At (5), the proxy 154 validates the query, by confirming that the pool identified within the encapsulated query matches a pool provided by the proxy 154. In some embodiments, validation at the proxy 154 may be omitted, as the router 156 is expected to pass queries only to a proxy 154 providing a connection pool identified within a request. However, additional verification at the proxy 154 may increase security of the service 150. In instances where no validation occurs at the proxy 154, the router 156 may decapsulate the query and transmit the query to the proxy 154 in decapsulated form.

At (6), the proxy 154 decapsulates the query (if necessary), and transmits the query to the instance 122 via an existing connection to the instance 122. (In the case that no existing connection to the instance 122 is in an idle state, the proxy 154 may initiate a new connection to the database, such as by the interactions of FIG. 5, discussed above.) As noted above, by using an existing connection to the instance 122, a set of connections to the instance 122 may be "oversubscribed," enabling more services (e.g., task executions 134) to maintain (from their point of view) connections to the instance 122 than the instance 122 would be able to support without use of a connection pool.

At (7), the instance 122 executes the query to generate a response, which is returned to the proxy 154. The proxy 154, in turn, returns the response to the router 156 at (8), which returns the response to the interface 136 at (9), which returns the response to the execution, at (10). Thus, the execution 134 is enabled to submit operations to the instance 122 and obtain a result of that operation.

In one embodiment, the proxy 154 transmits the query to the instance 122 by utilizing a virtual network of the virtual private environment 120A, such that (from the point of view of the instance 122) the query appears to originate within the environment 120A. As noted above, the task execution 134 may submit the query to the interface 136 within a common execution environment (e.g., at a "localhost" address). Thus, the appearance of a local client-database connection is provided to both the task execution 134 and database instance 122, despite these services existing in disparate and potentially otherwise isolated networks.

Figure 9:
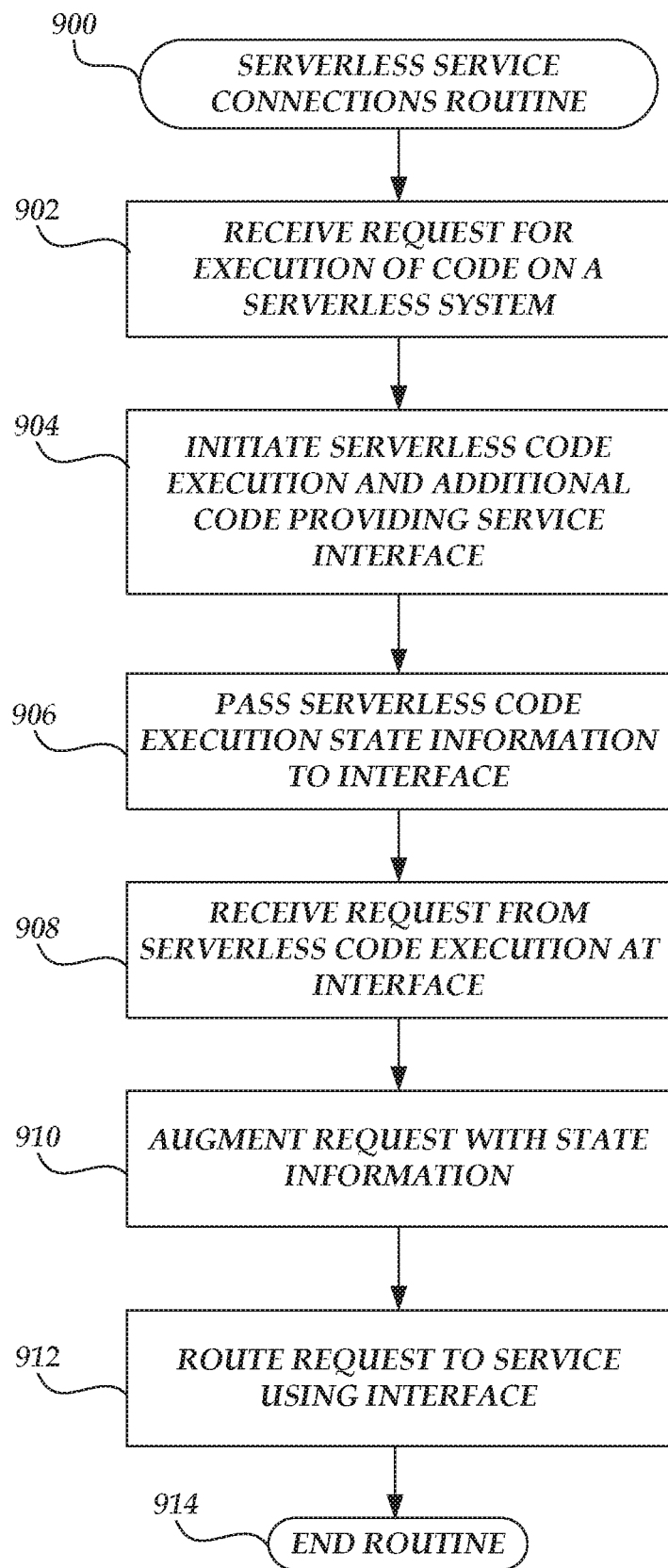
FIG. 9 is a flow chart depicting an illustrative routine for initiating connections between serverless code executions and target network services.
Figure 10:
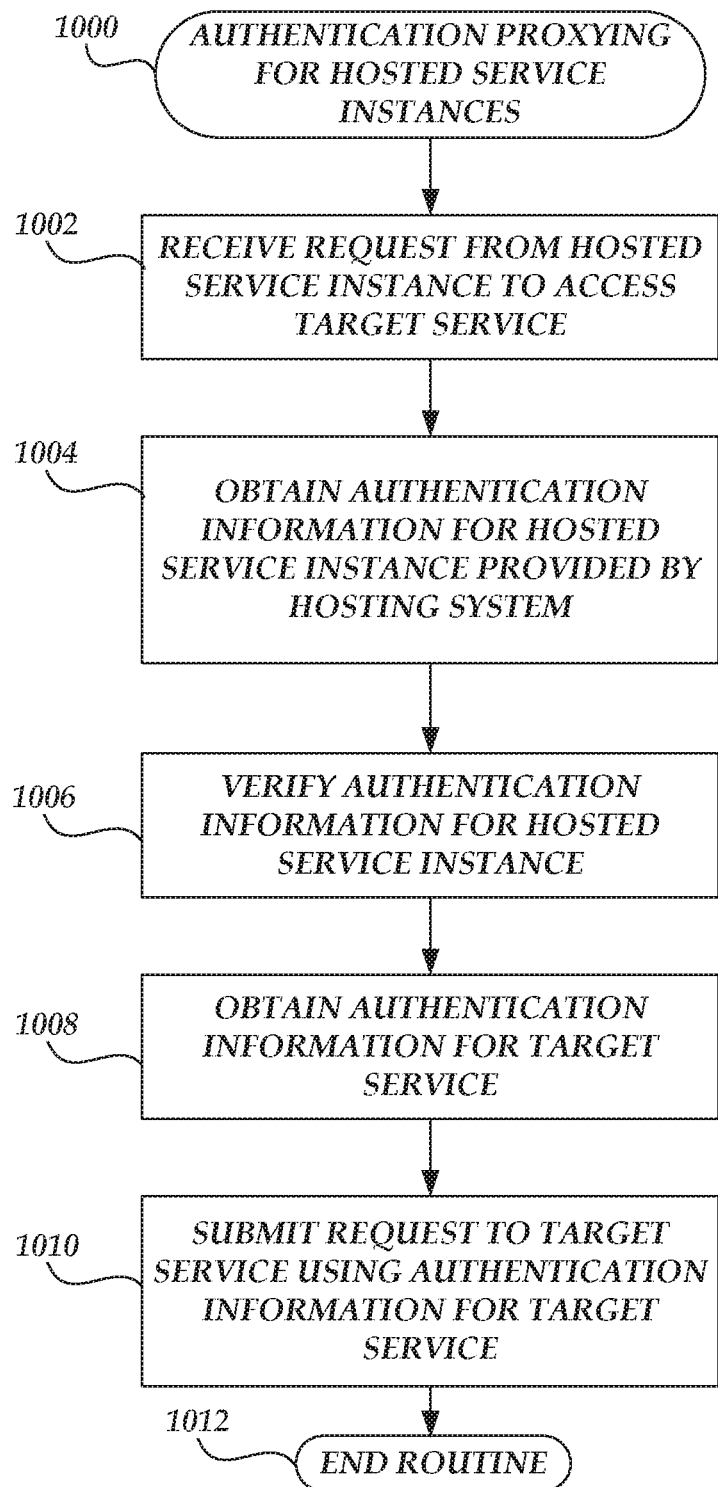
FIG. 10 is a flow chart depicting an illustrative routine for providing authentication to hosted services instances.

The above-described interactions provide a number of benefits over prior approaches. For example, as discussed above, these interactions enable a connection manager service to provide multiple connection pools associated with multiple services, even when such services exist within isolated network environments (e.g., virtual private environments 120), and to route requests to such pools based on identifiers of the pools. These interactions further enable simplification of tasks on an on-demand code execution system, by enabling use of a pooling interface 136 that can append additional information to requests received from task executions, such as authentication information and an identifier of the service, thus enabling the task execution to make requests to a service without specifying this information. These interactions further enable authentication of hosted services based on a pre-existing authentication scheme of the hosted service, by utilizing authentication information provided by a hosting system to authenticate the hosted service to another network service (which may utilize a different authentication scheme). FIGS. 9-11 depict illustrative routines that may be implemented by elements of the environment 100 to provide these benefits.

Figure 8:
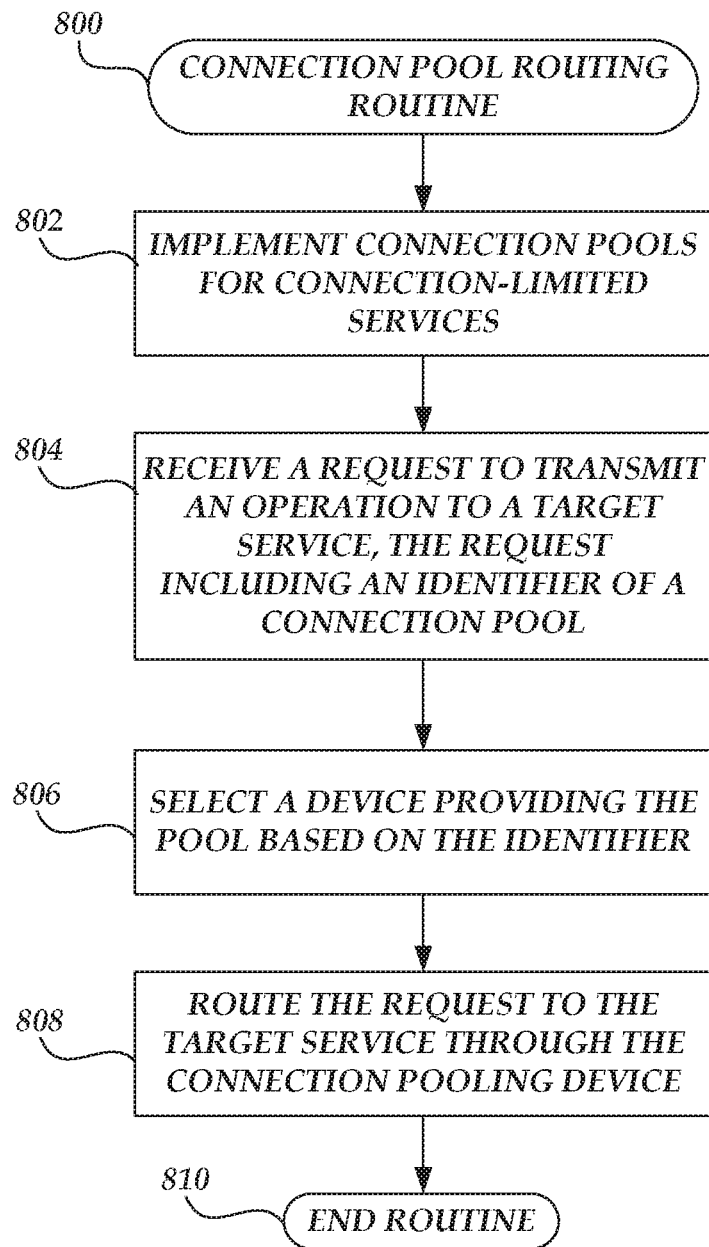
FIG. 8 is a flow chart depicting an illustrative routine for providing connection pools to connection-limited network services.

Specifically, FIG. 8 depicts a connection pool routing routine 800, which may be used to provide connection pools for connection-limited services, and to route requests to those pools based on an identifier of the pool. The routine 800 may be implemented, for example, by the connection manager service 150.

The routine 800 begins at block 802, where the connection manager service 150 implements connection pools for connection-limited services. Illustratively, each connection pool may be implemented by one or more connection proxies 154. Where the connection-limited services exist within isolated environments, the proxies 154 can be configured to access the isolated environments.

At block 804, the connection manager service 150 receives a request to transmit an operation to a target network service, the request including an identifier of the connection pool. Illustratively, the request may be received at a connection router 156 of the connection manager service 150. In one embodiment, the request may include the identifier as a header of an encapsulated data packet, the encapsulated portion of which corresponds to a wire protocol of the target network service. For example, the encapsulated portion may conform to a particular database protocol when the target network service is a database service.

At block 806, the connection manager service 150 selects a device providing a pool for the target network service, based on the identifier as included within the request. Illustratively, the connection manager service 150 may utilize DNS to map the identifier to a network address of a proxy 154 providing a pool for the service. In some instances, the connection manager service 150 may apply load balancing criteria to select from multiple proxies 154 providing a pool for the service.

At block 808, the connection manager service 150 routes the request to the target service through the selected device. Illustratively, the connection manager service 150 may pass the request to the device through a first network connection, and the device may then pass the request to the service via a pre-existing network connection (or, of no idle pre-existing connection exists, may create an additional connection to the network service.

The routine 800 then ends at block 810.

FIG. 9 depicts a serverless service connections routine 900, which may be utilized to enable serverless code executions (e.g., task execution 134) to connect to network-accessible services, without requiring information for the service (such as an identifier of the service, or metadata of the task, authentication information, or other state information of the task execution) to be hard-coded into user-defined code. The routine 900 may be implemented, for example, by the on-demand code execution system 130.

The routine 900 begins at block 902, where the on-demand code execution system 130 obtains a request to execute code on the serverless system. The request may be obtained, for example, based on an API call from a client device 102, detection of a pre-defined trigger condition on the system 130, etc.

At block 904, the on-demand code execution system 130 initiates execution of the serverless code (e.g., a task execution). For example, the system 130 may identify or generate an execution environment, such as a virtual machine instance or software container, for the code, provision the environment with the code, and execute the code within the environment. In addition to the code, the on-demand code execution system 130 further executes additional code providing a service interface for a target network-accessible service. The service interface may for example correspond to a TCP server accessible to the serverless code via a relative identifier (e.g., the "localhost" network address). In one embodiment, the service interface is implemented in the same execution environment as the serverless code.

At block 906, the on-demand code execution system 130 passes execution state information to the interface. The execution state information may illustratively be any information regarding the task execution as implemented on the on-demand code execution system 130, such as authentication information of the execution (e.g., an authentication token indicating that the task was executed by the system 130 in an authorized state), permissions information indicating resources to which the execution has access permissions, a current time as maintained at the task execution, etc. In some embodiments, additional data may be passed to the interface, such as service metadata for the serverless code. The service metadata may be defined by a user of the on-demand code execution system 130 when configuring serverless code, such that the metadata is modifiable independent of the user-defined code. Service metadata may include, for example, an identifier of a connection pool for a service.

At block 908, on-demand code execution system 130 receives a request to access the service from the serverless code at the interface. For example, the system 130 may obtain a local TCP data packet addressed to the interface.

At block 910, the on-demand code execution system 130, via operation of the interface, augments the request with state information, thus enabling a downstream component to obtain the state information without requiring the task execution to be hard-coded to provide such information. In one embodiment, augmenting the request may include encapsulating the request with a header including the state information. Use of encapsulation may be beneficial, for example, in allowing a wire protocol format of the initial request to be maintained. For example, encapsulation of the request by an interface may reduce or eliminate the need for use of custom libraries or functions within a task execution, instead enabling the task to utilize standard libraries or functions (e.g., those intended to access a local service or a service not associated with a connection manager service 150).

At block 912, the on-demand code execution system 130 routes the augmented request to the service using the interface. Illustratively, the interface may transmit the request to a router configured to route the request based on state information, such as by first authenticating the request based on an authentication token with which the request has been augmented at the interface.

The routine 900 then ends at block 914.

FIG. 10 depicts a routine 1000 providing authentication proxying for hosted service instances, which may be utilized to enable hosted service instances to utilize one set of authentication information (e.g., providing by a hosting system for the hosted service) to authenticate to other services utilizing other authentication information (e.g., a database service using a username and password), without requiring that the hosted service directly store the other authentication information. The routine 1000 may be implemented, for example, by the connection manager service 150.

The routine 1000 begins at 1002, where the service 150 obtains a request for a hosted service instance to access a target service. The hosted service instance may correspond, for example, to a task execution on the on-demand code execution system 130.

At block 1004, the service 150 obtains authentication information for the hosted service instance provided by a hosting system for the hosted service instance. For example, where the hosted service instance is a task execution on the on-demand code execution system 130, the service 150 may obtain authentication information for the task execution from the system 130. In some instances, the service 150 may query the hosting system for authentication information. In another embodiment, the authentication information may be included within the request (e.g., as a field of a header of the request).

At block 1006, the service 150 verifies the authentication information for the hosted service instance. Illustratively, the service 150 may transmit the authentication information to an authentication service that authored the information, in order to verify its authenticity. In addition, the service 150 may obtain permissions for the target network service, and verify that the authentication information complies with such permissions (e.g., that the authentication information corresponds to a role that has permissions to access the service).

At block 1008, the service 150 obtains authentication information for the target service. The authentication information is illustratively stored separately from the hosted service instance and independently modifiable. For example, the authentication information for the target service may be stored within a secrets manager service.

At block 1010, the service 150 submits the request to the target service using the authentication information for the target service. For example, the service 150 may initiate a connection to the target service using the authentication information for the target service, and pass the request to the target service over that connection. In this manner, a hosted service instance may pass requests to a target service without requiring that the hosted service instance itself store authentication information for the target service.

The routine 1000 then ends at block 1012.

While illustrative routines are discussed above, various modifications or additions to these routines are possible and contemplated herein. For example, the routines of FIGS. 8-10 may be implemented in combination to provide the benefits described herein, as depicted in the interactions of FIGS. 4-7, above. Thus, the interactions of FIGS. 8-10 are intended to be illustrative and not exhaustive in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

Examples of the embodiments of the present disclosure can be described in view of the following clauses:

Clause 1. A system comprising:
one or more computing devices providing a plurality of connection pools, each connection pool providing a pool of connections to a corresponding connection-limited, network-accessible service of a plurality of connection-limited, network-accessible services; and a connection router device configured to:
- receive a transmission of an operation to a target network service of the plurality of connection-limited, network-accessible services, the transmission including an identifier of a connection pool, from the plurality of connection pools, corresponding to the target network service;
- identify a computing device of the one or more computing devices providing the connection pool based at least in part on the identifier of the connection pool; and
- route the transmission to the computing device providing the connection pool;
- wherein the computing device providing the connection pool is configured to obtain the transmission and to forward the operation to the target network service through an existing connection to the target network service.

Clause 2. The system of Clause 1, wherein the target network service is a database, and wherein the transmission corresponds to an encapsulated data packet comprising a header including the identifier of the connection pool and an encapsulated portion formatted according to a wire protocol of the database.

Clause 3. The system of Clause 1, wherein the target network service is included within a virtual private network environment, and wherein the system further comprises a configuration device configured to:
- receive a request to generate the connection pool corresponding to the target network service; and
- configure the computing device to access the virtual private network environment.

Clause 4. The system of Clause 2, wherein the computing device receives the transmission outside the virtual private network environment and forwards the operation to the target network service through the virtual private network environment.

Clause 5. The system of Clause 1, wherein the transmission includes a network packet encapsulated with a header including the identifier of the connection pool, and wherein the computing device providing the connection pool is configured to decapsulate the network packet prior to forwarding the operation to the target network service.

Clause 6. A computer-implemented method comprising:
- receiving a transmission of an operation to a target network service of a plurality of connection-limited, network-accessible services, the transmission including an identifier of a connection pool, from a plurality of connection pools, corresponding to the target network service, wherein each connection pool of the plurality of connection pools provides a pool of connections to a corresponding connection-limited, network-accessible service of the plurality of connection-limited, network-accessible services;
- identifying a computing device providing the connection pool based at least in part on the identifier of the connection pool; and
- routing the transmission to the computing device providing the connection pool;
- wherein the computing device providing the connection pool is configured to obtain the transmission and to forward the operation to the target network service through an existing connection to the target network service.

Clause 7. The computer-implemented method of Clause 6, wherein identifying a computing device providing the connection pool based at least in part on the identifier of the connection pool comprises resolving the identifier of the connection pool into a network address of the computing device utilizing a domain name service (DNS) server.

Clause 8. The computer-implemented method of Clause 6, wherein a set of computing devices provide the connection pool, and wherein identifying a computing device providing the connection pool based at least in part on the identifier of the connection pool comprises applying load balancing criteria to identify the computing device among the set of computing devices.

Clause 9. The computer-implemented method of Clause 6, wherein the transmission further includes authentication information of a source device, and wherein the method further comprises authenticating the source device using the authentication information prior to routing the transmission to the computing device providing the pool.

Clause 10. The computer-implemented method of Clause 9, wherein the transmission includes a network packet identifying the operation encapsulated with a header including the authentication information of the source device.

Clause 11. The computer-implemented method of Clause 9, wherein the source device is a virtual computing device hosted on a hosted computing environment, and wherein the authentication information of the source device is provided to the virtual computing device by the hosted computing environment.

Clause 12. The computer-implemented method of Clause 6, wherein the target network service is included within a virtual private network environment, and wherein the method further comprises:
- receiving a request to generate the connection pool corresponding to the target network service; and
- configuring the computing device to access the virtual private network environment.

Clause 13. The computer-implemented method of Clause 5 further comprising:
- receiving a response of the target network service from the computing device providing the connection pool; and
- returning the response to a source device from which the transmission was received.

Clause 14. A system comprising:
- a data store including computer-executable instructions; and
- one or more processors configured to execute the computer-executable instructions to:
  - receive a transmission of an operation to a target network service of a plurality of connection-limited, network-accessible services, the transmission including an identifier of a connection pool, from a plurality of connection pools, corresponding to the target network service, wherein each connection pool of the plurality of connection pools provides a pool of connections to a corresponding connection-limited, network-accessible service of the plurality of connection-limited, network-accessible services;
  - identify a computing device providing the connection pool based at least in part on the identifier of the connection pool; and
  - route the transmission to the computing device providing the connection pool;
  - wherein the computing device providing the connection pool is configured to obtain the transmission and to forward the operation to the target network service through an existing connection to the target network service.

Clause 15. The system of Clause 14, wherein the target network service is included within a virtual private network environment, and wherein the one or more processors are further configured to:
receive a request to generate the connection pool corresponding to the target network service; and
configure the computing device to access the virtual private network environment.

Clause 16. The system of Clause 15, wherein the computing device receives the transmission outside the virtual private network environment and forwards the operation to the target network service through the virtual private network environment.

Clause 17. The system of Clause 14, wherein the transmission includes a network packet identifying to the operation encapsulated with a header including the identifier of the connection pool, and wherein the computing device providing the connection pool is configured to decapsulate the network packet prior to forwarding the operation to the target network service.

Clause 18. The system of Clause 14, wherein the transmission further includes authentication information of a source device, and wherein the one or more processors are further configured to authenticate the source device using the authentication information prior to routing the transmission to the computing device providing the pool.

Clause 19. The system of Clause 18, wherein the source device is a virtual computing device hosted by on a hosted computing environment, and wherein the authentication information of the source device is provided by the hosted computing environment.

Clause 20. The system of Clause 14, wherein the one or more processors are further configured to act as a proxy for additional communications between the computing device providing the connection pool and source device for the transmission.

Clause 21. A system comprising:
a hosting system associated with an on-demand code execution system, the hosting system comprising one or more computing devices configured to:
receive a request to execute user-defined code implementing a task on the on-demand code execution system, wherein the task is associated with metadata including an authentication role under which the task should be executed;
in response to the request, execute, within an execution environment of the on-demand code execution system, the user-defined code implementing the task and additional code implementing an interface to the network-accessible service; and
pass to the interface an authentication token corresponding to the authentication role for the task;
wherein the user-defined code causes the computing device to request access to a network-accessible service from the interface; and
wherein the additional code providing the interface causes the computing device to:
receive the request to access the network-accessible service;
encapsulate the request with a header including the authentication token for the task to result in an encapsulated request; and
transmit the encapsulated request to a router, wherein the router is configured to authenticate the request based on the authentication token.

Clause 22. The system of Clause 21, wherein the network-accessible service is a connection-limited database service, and wherein the endpoint provides a connection pool for the database service.

Clause 23. The system of Clause 21, wherein the additional code providing the interface causes the computing device to implement a transport control protocol (TCP) server on which to receive the request.

Clause 24. The system of Clause 23, wherein the user-defined code causes the computing device to request access to a network-accessible service from the interface by transmitting the request to the TCP server by use of a local relative identifier for the execution environment.

Clause 25. A computer-implemented method comprising:
receiving a request to execute user-defined code implementing a task on the on-demand code execution system, wherein the task is associated with metadata specifying that calls to a network-accessible service originating from executions of the task are to be augmented with information regarding a state of an execution environment in which the task is executed;
in response to the request, executing, on the on-demand code execution system, the user-defined code implementing the task and additional code implementing an interface to the network-accessible service; and
passing to the interface the information regarding the state of the execution environment in which the task is executed;
wherein executing the user-defined code implementing the task comprises requesting access to the network-accessible service from the interface; and
wherein executing the additional code providing the interface comprises:
receiving the request to access the network-accessible service;
augmenting the request with the information regarding the state of the execution environment in which the task is executed to result in an augmented request; and
transmitting the augmented request to the network-accessible service.

Clause 26. The computer-implemented method of Clause 25, wherein the information regarding the state of the execution environment in which the task is executed comprises an authentication token indicating the state of the execution environment as authenticated by the on-demand code execution system.

Clause 27. The computer-implemented method of Clause 25, wherein the additional code is executed within the execution environment.

Clause 28. The computer-implemented method of Clause 25, wherein requesting access to the network-accessible service from the interface comprises identifying the interface using a relative identifier of a local execution environment.

Clause 29. The computer-implemented method of Clause 25, wherein requesting access to the network-accessible service from the interface comprises requesting access without specifying authentication information.

Clause 30. The computer-implemented method of Clause 29, wherein the information regarding the state of the execution environment in which the task is executed comprises a listing of resources to which the task has access permissions.

Clause 31. The computer-implemented method of Clause 25, wherein augmenting the request with the information regarding the state of the execution environment in which the task is executed to result in the augmented request comprises encapsulating the request with a header comprising the information regarding the state of the execution environment in which the task is executed.

Clause 32. A system comprising:
a hosting system associated with an on-demand code execution system, the hosting system comprising one or more computing devices configured to:
receive a request to execute user-defined code implementing a task on the on-demand code execution system, wherein the task is associated with metadata specifying that calls to a network-accessible service originating from executions of the task are to be augmented with information regarding a state of an execution environment in which the task is executed;
in response to the request, execute, within an execution environment of the on-demand code execution system, the user-defined code implementing the task and additional code implementing an interface to the network-accessible service; and
pass to the interface the information regarding the state of the execution environment in which the task is executed;
wherein the user-defined code causes the computing device to request access to a network-accessible service from the interface; and
wherein the additional code providing the interface causes the computing device to:
receive the request to access the network-accessible service;
augment the request with the information regarding the state of the execution environment in which the task is executed to result in an augmented request;
transmit the augmented request to the network-accessible service.

Clause 33. The system of Clause 33, wherein augmenting the request with the information regarding the state of the execution environment in which the task is executed to result in the augmented request comprises encapsulating the request with a header comprising the information regarding the state of the execution environment in which the task is executed.

Clause 34. The system of Clause 34, wherein the request is in a wire protocol format of the network-accessible service and wherein encapsulating the request maintains the wire protocol format of the request within an encapsulated portion of the augmented request.

Clause 35. The system of Clause 33, wherein the one or more computing devices of the hosting system are further configured to pass to the interface authentication information for the task, wherein the additional code providing the interface further causes the computing device to add the authentication information to the request, and wherein the request to the network-accessible service is authenticated based at least partly on the authentication information for the task.

Clause 36. The system of Clause 33, wherein the one or more computing devices of the hosting system are further configured to pass to the interface an identifier of the network-accessible service, wherein the additional code providing the interface further causes the computing device to add the identifier to the request, and wherein the request to the network-accessible service is routed to the network-accessible service based at least partly on the identifier.

Clause 37. The system of Clause 33, wherein the additional code providing the interface causes the computing device to implement a transport control protocol (TCP) server on which to receive the request, and wherein the user-defined code causes the computing device to request access to a network-accessible service from the interface by transmitting the request to the TCP server by use a local relative identifier for the execution environment.

Clause 38. The system of Clause 33, wherein executing the user-defined code and the additional code comprising executing the user-defined code within a first virtual machine instance and executing the additional code within a second virtual machine instance.

Clause 39. The system of Clause 33, wherein the user-defined code causes the computing device to request access to the network-accessible service from the interface without specifying authentication information for the network-accessible service.

Clause 40. The system of Clause 33, wherein the additional code providing the interface causes the computing device to act as a proxy for additional communications between the user-defined code and the network-accessible service.

Clause 41. A system comprising:
a hosting system associated with an on-demand code execution system, the hosting system comprising one or more computing devices configured to:
receive a client request to execute user-defined code implementing a task on the on-demand code execution system, wherein the task is associated with metadata including an authentication role under which the task should be executed;
in response to the request, execute, within an execution environment of the on-demand code execution system, the user-defined code implementing the task; and
pass to the execution environment authentication information for the authentication role;
wherein the user-defined code causes the on-demand code execution system to transmit a request for an operation on a network-accessible service using the authentication information for the authentication role; and
a connection subsystem comprising one or more computing devices configured to:
receive the request for the operation on the network-accessible service using the authentication information for the authentication role;
verify that the authentication information authenticates the authentication role and that the authentication role has permission to access the network-accessible service; and
request the operation on the network-accessible service using authentication information for the network-accessible service, wherein the authentication information for the network-accessible service is distinct from the authentication information for the authentication role and is not provided by the computing device executing the user-defined code.

Clause 42. The system of Clause 41, wherein the authentication information for the authentication role is an authentication token, and wherein the authentication information for the network-accessible service includes a password for the network-accessible service.

Clause 43. The system of Clause 41, wherein the network-accessible service is a connection-limited database service, and the connection subsystem implements a connection pool for the connection-limited database service comprising a pool of connections to the connection-limited database service, individual connections of the pool authenticated utilizing the authentication information for the network-accessible service.

Clause 44. The system of Clause 41, wherein one or more computing devices of the hosting system are further configured to execute within the execution environment additional code implementing an interface, and wherein passing the authentication information to the execution environment comprises passing the authentication information to the interface.

Clause 45. A computer-implemented method comprising, at a computing device:
receiving a request to access a target network-accessible service using authentication information, wherein the request is received from a hosted network service, and wherein the authentication information is provided to the hosted network service by a hosting system hosting the hosted network service in connection with hosting the hosted network service;
verifying that the authentication information authenticates to an authentication role that has permissions to access the target network-accessible service;
retrieving authentication information for the target network-accessible service, wherein the authentication information for the target network-accessible service is distinct from the authentication information of the hosted network service; and
requesting the operation on the target network-accessible service using the authentication information for the target network-accessible service.

Clause 46. The computer-implemented method of Clause 45, further comprising, at the hosting system:
receiving a client request to execute user-defined code implementing a task corresponding to the hosted network service on an on-demand code execution system, wherein the task is associated with metadata indicating that the task should be executed under the authentication role;
in response to the request, executing, within an execution environment of the on-demand code execution system, the user-defined code implementing the task; and
passing to the execution environment the authentication information for the authentication role;
wherein the user-defined code causes the on-demand code execution system to transmit the request to access the target network-accessible service using the authentication information for the authentication role.

Clause 47. The computer-implemented method of Clause 46 further comprising executing within the execution environment additional code implementing an interface, and wherein passing the authentication information to the execution environment comprises passing the authentication information to the interface.

Clause 48. The computer-implemented method of Clause 45, wherein verifying that the authentication information authenticates to the authentication role that has permissions to access the target network-accessible service comprises:
transmitting the authentication information to an authentication service that authored the authentication information;
receiving verification that the authentication information authenticates to the authentication role;
obtaining permissions information for the target network-accessible service; and
verifying that the permissions information indicates that the authentication role has permissions to access the target network-accessible service.

Clause 49. The computer-implemented method of Clause 45, wherein the network-accessible service is a connection-limited database service, and wherein requesting the operation on the target network-accessible service using the authentication information for the target network-accessible service comprises:
initiating a connection with the target network-accessible service using the target; and
transmitting the request via the connection.

Clause 50. The computer-implemented method of Clause 45, wherein the network-accessible service is within an isolated network environment, wherein the request is received outside the isolated network environment, and wherein requesting the operation on the target network-accessible service using the authentication information for the target network-accessible service comprises transmitting a request for the operation within the isolated network environment.

Clause 51. The computer-implemented method of Clause 45, wherein the request is encapsulated within a header including the authentication information.

Clause 52. The computer-implemented method of Clause 51, wherein the method further comprises:
decapsulating the request; and
forwarding the request to the target network-accessible service.

Clause 53. The computer-implemented method of Clause 45, wherein the header further comprises an identifier of an endpoint for the target network-accessible service.

Clause 54. The computer-implemented method of Clause 53, wherein the method further comprises identifying the endpoint based on the identifier.

Clause 55. A system comprising:
a data store including computer-executable instructions; and
one or more processors configured to execute the computer-executable instructions to:
receive a request to access a target network-accessible service using authentication information, wherein the request is received from a hosted network service, and wherein the authentication information is provided to the hosted network service by a hosting system hosting the hosted network service in connection with hosting the hosted network service;
verify that the authentication information authenticates to an authentication role that has permissions to access the network-accessible service;
retrieve authentication information for the target network-accessible service, wherein the authentication information for the target network-accessible service is distinct from the authentication information of the hosted network service; and
request the operation on the target network-accessible service using the authentication information for the target network-accessible service.

Clause 56. The system of Clause 55, wherein the one or more processors are further configured to:
receive a client request to execute user-defined code implementing a task corresponding to the hosted network service on an on-demand code execution system, wherein the task is associated with metadata indicating that the task should be executed under the authentication role;

in response to the request, executing, within an execution environment of the on-demand code execution system, the user-defined code implementing the task; and passing to the execution environment the authentication information for the authentication role;

wherein the user-defined code causes the on-demand code execution system to transmit the request to access the target network-accessible service using the authentication information for the authentication role.

Clause 57. The system of Clause 56, wherein the one or more processors are further configured to execute within the execution environment additional code implementing an interface, and wherein passing the authentication information to the execution environment comprises passing the authentication information to the interface.

Clause 58. The system of Clause 57, wherein the user-defined code causes the on-demand code execution system to transmit the request for the operation on a network-accessible service using the authentication information for the authentication role at least partly by causing the on-demand code execution system to pass the request for the operation to the interface.

Clause 59. The system of Clause 58, wherein execution of the additional code implementing the interface causes the on-demand code execution system to add the authentication information for the authentication role to the request prior to transmitting the request outside of the on-demand code execution system.

Clause 60. The system of Clause 58, wherein to verify that the authentication information authenticates to the authentication role that has permissions to access the target network-accessible service, the one or more processors are further configured to:

transmit the authentication information to an authentication service that authored the authentication information;

receive verification that the authentication information authenticates to the authentication role;

obtain permissions information for the target network-accessible service; and verify that the permissions information indicates that the authentication role has permissions to access the target network-accessible service.

What is claimed is:

1. A system comprising:
one or more computing devices providing a plurality of connection pools, each connection pool providing a pool of connections to a corresponding connection-limited, network-accessible service of a plurality of connection-limited, network-accessible services; and
a connection router device configured to:
receive transmissions from at least two source computing devices directed to a target network service of the plurality of connection-limited, network-accessible services, each transmission including an identifier of a connection pool, from the plurality of connection pools, corresponding to the target network service;
identify a computing device of the one or more computing devices providing the connection pool based at least in part on the identifier of the connection pool; and
route the transmissions to the computing device providing the connection pool;
wherein the computing device providing the connection pool is configured to obtain the transmissions, establish a proxied connection between each of the at least two source computing devices and the target network service, and forward operations obtained via the proxied connections to the target network service through an existing, separate individual connection to the target network service, wherein the proxied connections between each of the at least two source computing devices and the target network service enable the individual connection to the target network service to simultaneously support the proxied connections of each of the at least two source computing devices.

2. The system of claim 1, wherein the target network service is a database, and wherein the transmission corresponds to an encapsulated data packet comprising a header including the identifier of the connection pool and an encapsulated portion formatted according to a wire protocol of the database.

3. The system of claim 1, wherein the target network service is included within a virtual private network environment, and wherein the system further comprises a configuration device configured to:
receive a request to generate the connection pool corresponding to the target network service; and
configure the computing device to access the virtual private network environment.

4. The system of claim 3, wherein the computing device receives the transmission outside the virtual private network environment and forwards the operation to the target network service through the virtual private network environment.

5. The system of claim 1, wherein the transmission includes a network packet encapsulated with a header including the identifier of the connection pool, and wherein the computing device providing the connection pool is configured to decapsulate the network packet prior to forwarding the operation to the target network service.

6. A computer-implemented method comprising:
receiving transmissions from at least two source computing devices directed to a target network service of a plurality of connection-limited, network-accessible services, each transmission including an identifier of a connection pool, from a plurality of connection pools, corresponding to the target network service, wherein each connection pool of the plurality of connection pools provides a pool of connections to a corresponding connection-limited, network-accessible service of the plurality of connection-limited, network-accessible services;
identifying a computing device providing the connection pool based at least in part on the identifier of the connection pool; and
routing the transmissions to the computing device providing the connection pool;
wherein the computing device providing the connection pool is configured to obtain the transmissions, establish a proxied connection between each of the at least two source computing devices and the target network service, and forward operations obtained via the proxied connections to the target network service through an existing, separate individual connection to the target network service, wherein the proxied connections between each of the at least two source computing devices and the target network service enable the individual connection to the target network service to simultaneously support the proxied connections of each of the at least two source computing devices.

7. The computer-implemented method of claim 6, wherein identifying a computing device providing the connection pool based at least in part on the identifier of the connection pool comprises resolving the identifier of the connection pool into a network address of the computing device utilizing a domain name service (DNS) server.

8. The computer-implemented method of claim 6, wherein a set of computing devices provide the connection pool, and wherein identifying a computing device providing the connection pool based at least in part on the identifier of the connection pool comprises applying load balancing criteria to identify the computing device among the set of computing devices.

9. The computer-implemented method of claim 6, wherein the transmission further includes authentication information of a source device, and wherein the method further comprises authenticating the source device using the authentication information prior to routing the transmission to the computing device providing the pool.

10. The computer-implemented method of claim 9, wherein the transmission includes a network packet identifying the operation encapsulated with a header including the authentication information of the source device.

11. The computer-implemented method of claim 9, wherein the source device is a virtual computing device hosted on a hosted computing environment, and wherein the authentication information of the source device is provided to the virtual computing device by the hosted computing environment.

12. The computer-implemented method of claim 6, wherein the target network service is included within a virtual private network environment, and wherein the method further comprises:
receiving a request to generate the connection pool corresponding to the target network service; and
configuring the computing device to access the virtual private network environment.

13. The computer-implemented method of claim 6 further comprising:
receiving a response of the target network service from the computing device providing the connection pool; and
returning the response to a source device from which the transmission was received.

14. A system comprising:
a data store including computer-executable instructions; and
one or more processors configured to execute the computer-executable instructions to:
receive transmissions from at least two source computing devices directed to a target network service of a plurality of connection-limited, network-accessible services, each transmission including an identifier of a connection pool, from a plurality of connection pools, corresponding to the target network service, wherein each connection pool of the plurality of connection pools provides a pool of connections to a corresponding connection-limited, network-accessible service of the plurality of connection-limited, network-accessible services;
identify a computing device providing the connection pool based at least in part on the identifier of the connection pool; and
route the transmissions to the computing device providing the connection pool;
wherein the computing device providing the connection pool is configured to obtain the transmissions, establish a proxied connection between each of the at least two source computing devices and the target network service, and forward operations obtained via the proxied connections to the target network service through an existing, separate individual connection to the target network service, wherein the proxied connections between each of the at least two source computing devices and the target network service enable the individual connection to the target network service to simultaneously support the proxied connections of each of the at least two source computing devices.

15. The system of claim 14, wherein the target network service is included within a virtual private network environment, and wherein the one or more processors are further configured to:
receive a request to generate the connection pool corresponding to the target network service; and
configure the computing device to access the virtual private network environment.

16. The system of claim 15, wherein the computing device receives the transmission outside the virtual private network environment and forwards the operation to the target network service through the virtual private network environment.

17. The system of claim 14, wherein the transmission includes a network packet identifying to the operation encapsulated with a header including the identifier of the connection pool, and wherein the computing device providing the connection pool is configured to decapsulate the network packet prior to forwarding the operation to the target network service.

18. The system of claim 14, wherein the transmission further includes authentication information of a source device, and wherein the one or more processors are further configured to authenticate the source device using the authentication information prior to routing the transmission to the computing device providing the pool.

19. The system of claim 18, wherein the source device is a virtual computing device hosted by on a hosted computing environment, and wherein the authentication information of the source device is provided by the hosted computing environment.

20. The system of claim 14, wherein the one or more processors are further configured to act as a proxy for additional communications between the computing device providing the connection pool and source device for the transmission.

* * * * *